United States Patent
Kim et al.

(10) Patent No.: US 11,534,977 B2
(45) Date of Patent: Dec. 27, 2022

(54) SYSTEM AND METHOD FOR ADDITIVE MANUFACTURING WITH TOOLPATH BRIDGES AND RESULTANT STRUCTURE

(71) Applicant: UT-Battelle, LLC, Oak Ridge, TN (US)

(72) Inventors: Seokpum Kim, Knoxville, TN (US); Vlastimil Kune, Knoxville, TN (US); Ahmed A. Hassen, Knoxville, TN (US); John M. Lindahl, Knoxville, TN (US); Brian K. Post, Knoxville, TN (US); Alex C. Roschli, Knoxville, TN (US); Phillip C. Chesser, Knoxville, TN (US); Michael C. Borish, Knoxville, TN (US); Gregory D. Dreifus, East Rockaway, NY (US); Lonnie J. Love, Knoxville, TN (US); Craig A. Blue, Knoxville, TN (US); Bentley T. Beard, II, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 454 days.

(21) Appl. No.: 16/750,631

(22) Filed: Jan. 23, 2020

(65) Prior Publication Data
US 2020/0230888 A1    Jul. 23, 2020

Related U.S. Application Data

(60) Provisional application No. 62/795,615, filed on Jan. 23, 2019.

(51) Int. Cl.
G05B 19/25    (2006.01)
B29C 64/393    (2017.01)
(Continued)

(52) U.S. Cl.
CPC ............ *B29C 64/393* (2017.08); *B33Y 50/02* (2014.12); *G05B 19/25* (2013.01); *G05B 19/37* (2013.01);
(Continued)

(58) Field of Classification Search
CPC ...................................................... G05B 19/41
See application file for complete search history.

(56) References Cited

U.S. PATENT DOCUMENTS 10,354,018 B2    7/2019    Savage et al.
10,399,280 B1    9/2019    Lensgraf et al.
(Continued)

OTHER PUBLICATIONS

Kim, Seokpum et al., "Graded infill structure of wind turbine blade accounting for internal stress in big area additive manufacturing", presented at CAMX Conference Proceedings, Dallas, TX, Oct. 15-18, 2018, pp. 1-10.
(Continued)

*Primary Examiner* — Monica A Huson
*Assistant Examiner* — Kelsey C Grace
(74) *Attorney, Agent, or Firm* — Warner Norcross + Judd LLP

(57) ABSTRACT

A system and method for improving additive manufacturing, including additive manufacturing toolpaths, is provided. The system and method includes a toolpath generator that obtains initial toolpaths of an object, identifies isolated paths in the toolpaths, and adds bridge connections between neighboring isolated paths in each layer to improve the toolpaths. The bridge connections facilitate the continuous and non-stop deposition of each layer according to improved toolpaths during additive manufacture, which can reduce total deposition time and improve the resultant additive manufacture.

15 Claims, 18 Drawing Sheets

(51) Int. Cl.
*B33Y 50/02* (2015.01)
*G05B 19/4099* (2006.01)
*G05B 19/37* (2006.01)
*G05B 19/41* (2006.01)
*G05B 19/39* (2006.01)
*G05B 19/40* (2006.01)
*B33Y 10/00* (2015.01)

(52) U.S. Cl.
CPC .............. *G05B 19/39* (2013.01); *G05B 19/40* (2013.01); *G05B 19/4099* (2013.01); *G05B 19/41* (2013.01); *B33Y 10/00* (2014.12); *G05B 2219/35134* (2013.01); *G05B 2219/49023* (2013.01)

(56) References Cited

U.S. PATENT DOCUMENTS 10,464,305 B2 11/2019 Inamura et al.
2018/0373227 A1* 12/2018 Sadusk ................ B29C 64/393

OTHER PUBLICATIONS

Dreifus, Gregory et al., "Path Optimization Along Lattices in Additive Manufacturing Using the Chinese Postman Problem", 3D Printing and Additive Manufacturing, vol. 4, No. 2, 2017, pp. 98-104.

Ding, Donghong et al., "A tool-path generation strategy for wire and arc additive manufacturing", International Journal of Advanced Manufacturing Technology, vol. 73, Apr. 11, 2014, pp. 173-183.

Dreifus, Gregory et al., "A Framework for Tool Path Optimization in Fused Filament Fabrication", SCF '17 proceedings of the 1st Annual ACM Symposium on Computational Fabrication, Cambridge, MA, Jun. 12-13, 2017, pp. 1-2.

Roschli, Alex et al., "Creating toolpaths without starts and stops for extrusion-based systems", presented at Proceedings of the 30th Annual International Solid Freeform Fabrication Symposium, Austin, TX, Aug. 12-14, 2019, pp. 1113-1125.

Mellor, Stephen et al., "Additive manufacturing: A framework for implementation", International Journal of Production Economics, vol. 149, Mar. 2014, pp. 194-201.

Gao, Wei et al., "The status, challenges, and future of additive manufacturing in engineering", Computer-Aided Design, vol. 69, Dec. 2015, pp. 65-89.

Adams, D. et al., "An implicit slicing method for additive manufacturing processes", Virtual and Physical Prototyping, vol. 13, No. 1, 2018, pp. 2-7.

Kim, Seokpum et al., "An integrated design approach for infill patterning of fused deposition modeling and its application to an airfoil", presented at SAMPE Conference Proceedings, Seattle, WA, May 22-25, 2017, pp. 2136-2148.

Love, Lonnie J. et al., "Breaking Barriers in Polymer Additive Manufacturing", presented at SAMPE Conference Proceedings, Baltimore, MD, May 18-21, 2015, pp. 1-17.

Collins, Charles R. et al., "A circle packing algorithm", Computational Geometry, vol. 25, 2003, pp. 233-256.

Stephenson, Kenneth, "Circle Packing: A Mathematical Tale", Notices of the AMS, vol. 50, No. 11, Sep. 2003, pp. 1376-1388.

Bowers, John C. et al., "Ma-Schlenker c-Octahedra in the 2-Sphere", Discrete & Computational Geometry, vol. 60, Jul. 2018, pp. 9-26.

Dwivedi, Rajeev et al., "Automated Torch Path Planning Using Polygon Subdivision for Solid Freeform Fabrication Based on Welding", Journal of Manufacturing Systems, vol. 23, No. 4, 2004, pp. 278-291.

Wilf, Herbert S., "Algorithms and Complexity", First Edition 1994, citing Internet Edition, Summer 1994, pp. 1-135.

Bollweg, Peter et al., "Surface-adaptive and Collision-avoiding Path Planning for Five-axis Milling", Forschungsbericht Nr., vol. 808, Jan. 2006, pp. 1-74.

Hodgson, Gary et al., "Infill Patterns and Density" and "Infill Optimization" topics in section entitled "Print Configurations" of Slic3r Manual, available at slic3r.org and available at least as of Jan. 22, 2020.

* cited by examiner

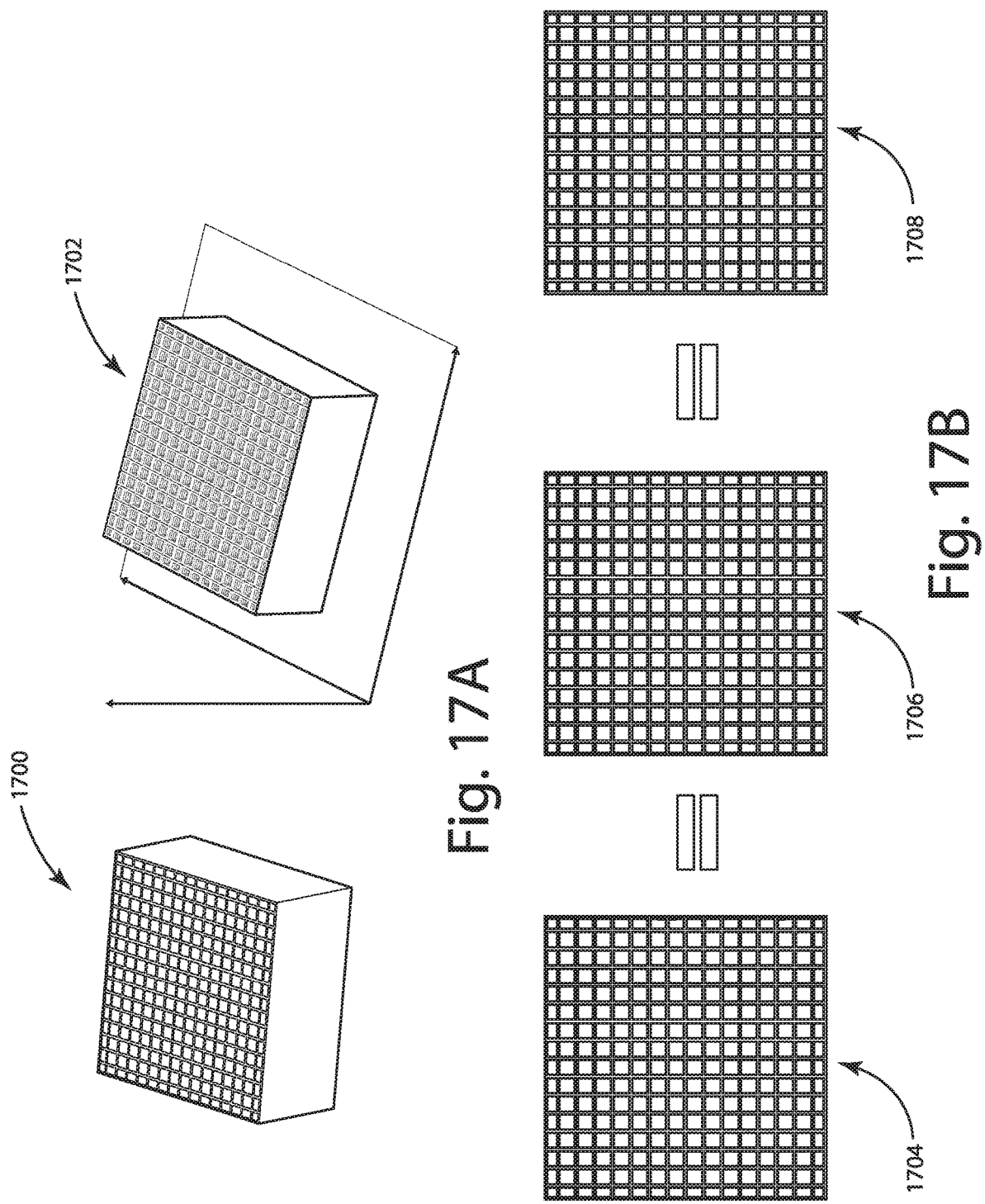

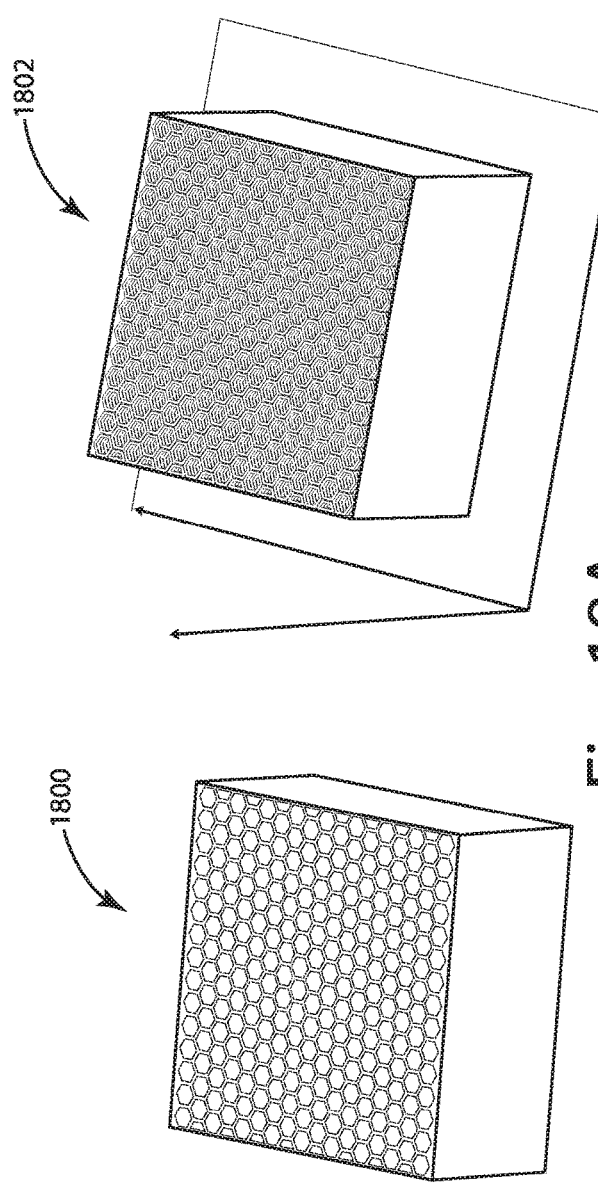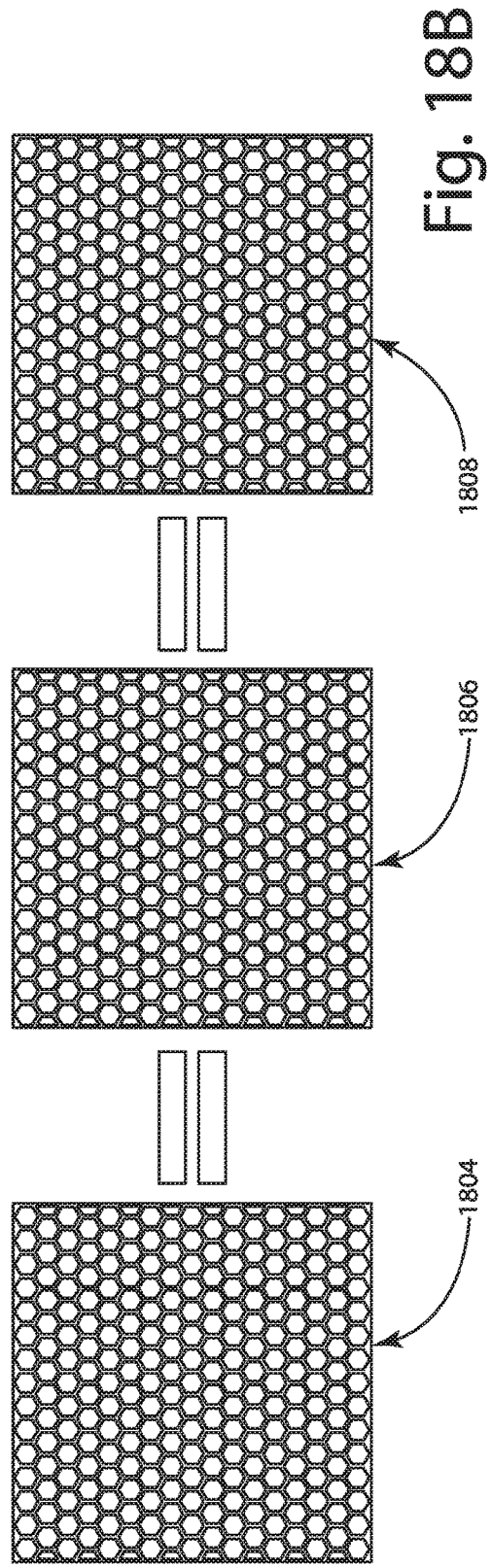

SYSTEM AND METHOD FOR ADDITIVE MANUFACTURING WITH TOOLPATH BRIDGES AND RESULTANT STRUCTURE

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to deposition based additive manufacturing systems and methods for generating improved toolpaths, systems and methods for manufacturing an additive structure via an improved toolpath, and the resultant additive structures themselves.

BACKGROUND OF THE INVENTION

In additive manufacturing, sometimes referred to as 3D printing, infill refers to the structure that is printed inside an object while perimeter and inset refer to the surface or near-surface geometry of the printed object. Generally, infill can be generated in two ways. One infill generation process involves changing the representation of the subject object interior from a solid build material or undefined structure into a combination of build material and air, such that the resultant object has a porous or lattice structure interior. This type of infill is generally defined by slicing software without regard for the representation of the object being sliced. That is, the slicer generates additive manufacturing instructions in the form of a toolpath for the printer to follow to create the infill layer by layer that are not based on internal structure of the design passed to the slicer. Perimeter and inset or just perimeter toolpaths are often generated by the slicing software based on a user provided computer aided design (CAD) model, such as a stereolithography (STL) file that describes the surface geometry of a three-dimensional object. The slicing software typically creates a complete toolpath for each layer that includes a perimeter toolpath for printing the surface geometry of the object as well as an infill toolpath that defines the toolpath for printing the internal structure of the object. The toolpath may or may not also include an inset toolpath. For example, going from outside in, a toolpath typically includes a perimeter, then inset, then infill to fill the remaining void. While generating the infill toolpath, the slicing software typically considers a combination of the surface geometry of the subject object and a variety of infill options, such as infill percentage and pattern, selected or pre-defined in the slicing software and generates a uniform grid pattern. Another infill generation process involves basing the infill toolpath on internal structure defined by the CAD model. This infill generation process can also involve slicing software creating a toolpath that includes a perimeter toolpath for printing the surface geometry of the object as well as an infill toolpath that defines the toolpath for printing the internal structure of the object. The difference is that in this infill generation process, the slicing software generates the infill toolpath based on the internal structure represented in the CAD model rather than ignoring any such internal structure like in the slicer-defined infill. Further, in some situations, an internal structure can be additively manufactured in isolation (e.g., for use as an internal structure in a structure that is manufactured separately, additively or not). In this situation, because the surface geometry is the internal structure itself, the toolpath generated by the slicer program may be referred to as an infill, perimeter, or inset toolpath, or just a toolpath.

Infill percentage and pattern can influence print weight, material usage, strength, print time, and a variety of other properties of the resultant additive structure. In general, the higher the infill percentage, the stronger the object, but the longer it takes to print. An infill percentage between 5%-50% is common for providing a reasonable balance between weight, material usage, strength, and print time, though lower or higher infill percentages make sense for some applications.

Regardless of the selected infill percentage, an infill pattern is typically used to define the structure inside the printed object. Often different infill patterns will have various advantages and trade-offs between print time, strength, and material usage. Typically the infill pattern is a lattice structure. Some common infill patterns include honeycomb, triangle, grid, and cubic infill patterns.

Empty travel time can makeup an excessive portion of the overall print time. For example, a significant amount of time can be lost due to inefficiencies in conventionally generated infill toolpaths that include isolated paths. While printing, each time the printer reaches the end of an isolated path, the printer slows down its movement, stops deposition, travels without deposition, restarts deposition, and accelerates its movement speed while depositing. This process (slowdown, deposition stop, empty travel, deposition restart, and acceleration) induces the following problems: (1) the total deposition time becomes significantly longer as the number of disconnected paths in the infill toolpath increases; (2) the material at the end of a disconnected path can be dragged by the printer at the beginning of empty travel movement; and (3) unwanted material can ooze from the printer tip during empty travel movement. These issues can cause imperfect deposition, and the accumulation of the imperfect deposition over multiple layers can result in printing failure. Similar issues are presented by perimeter and inset toolpaths that include isolated paths, such as when printing objects that include a lattice or frame pattern on the perimeter or inset. A system and method for improved deposition in additive manufacturing that addresses these and other issues is desirable.

SUMMARY OF THE INVENTION

The present invention provides a system and method for improving additive manufacture of an additive structure by adding bridges. The system and method includes adding bridge connections or paths between isolated paths of one or more toolpath layers. The bridge connections can enable continuous, even Eulerian, toolpath layers that can substantially reduce total deposition time for each layer.

One embodiment of a method in accordance with the present invention includes obtaining an initial or base toolpath, identifying isolated paths in the toolpath, and adding bridge connections to the toolpath. One embodiment of a system in accordance with the present disclosure includes a toolpath generator with a slicer configured to obtain a toolpath and a bridger configured to identify isolated paths in the toolpath and add bridge connections to the toolpath. The toolpath generator can be configured to output toolpath adjustments, updated toolpaths, or additive manufacturing instructions that include the bridge connections. The system and method can enable additive manufacture of an additive structure that includes bridge connections. One embodiment, in accordance with the present invention is directed to the additive structure that includes the bridge connections.

The system and method can include positioning of the bridge connections based on a variety of factors. Bridge connections can connect isolated paths. The bridge connections can be restricted to being between neighboring isolated paths and specifically between neighboring vertices of different isolated paths. Bridge connections can also be restricted to areas anticipated to be covered with deposition as a result of the base toolpath.

In general, one innovative aspect of the subject matter described in this specification can be embodied in a method of improving an additive manufacturing toolpath for an object. The method includes obtaining a base toolpath; identifying a plurality of isolated paths in the base toolpath, each of the plurality of isolated paths including a plurality of vertices; and adding a plurality of bridge paths to the base toolpath. Each bridge path connects one of the plurality of vertices from one of the plurality of isolated paths to a neighboring vertex from the plurality of vertices from a different one of the plurality of isolated paths.

The foregoing and other embodiments can each optionally include one or more of the following features, alone or in combination. In particular, one embodiment includes all the following features in combination.

In some embodiments, the method can include determining whether one of the plurality of vertices from one of the plurality of isolated paths neighbors a vertex of a different one of the plurality of isolated paths by comparing distance therebetween to a threshold value. In some embodiments, the method can include determining vertices are neighbors by virtue of the distance between the vertices being below a threshold value.

In some embodiments, the base toolpath can include an infill toolpath that defines internal structure of the object. In some embodiments, the base toolpath can include a perimeter toolpath that defines surface features of the object.

In some embodiments, the method can include restricting the adding of the plurality of bridge paths to areas to be covered in deposition during additive manufacturing of the object according to the base toolpath. In some embodiments, the method can include counting a number of paths emanating from each vertex of the plurality of vertices including paths in the base toolpath and bridge paths, in response to each vertex where the number of paths emanating from that vertex is an odd number of paths. Here, the method also includes either adding an additional bridge path to an unconnected neighboring vertex or removing a previously added bridge path.

In some embodiments, the method can include generating printer instructions for each layer of the object. Here, the printer instructions for one layer are generated based on the base toolpath including the plurality of added bridge paths. In some cases, the printer instructions for the one layer can include instructions to print that layer of the object in a continuous path. In some cases, the printer instructions for the one layer can include instructions to decrease extrusion speed during printing of the plurality of added bridge paths.

In general, another innovative aspect of the subject matter described in this specification can be embodied in a method of improving additive manufacturing of an object. The method includes obtaining a plurality of toolpaths for additive manufacture of the object. Each of the plurality of toolpaths includes a plurality of vertices and a plurality of isolated paths between subsets of the plurality of vertices. The method further includes defining a plurality of bridge paths. Each bridge path connects one of the plurality of vertices of one of the isolated paths to a neighboring vertex of a different one of the plurality of isolated paths. Also, the method includes generating additive manufacturing instructions for additive manufacture of the object based on the plurality of toolpaths and the plurality of bridge paths; and additively manufacturing the object according to the additive manufacturing instructions.

The foregoing and other embodiments can each optionally include one or more of the following features, alone or in combination. In particular, one embodiment includes all the following features in combination.

In some embodiments, each of the plurality of toolpaths can be associated with a different layer of the object.

In some embodiments, the method can include determining whether one of the plurality of vertices from one of the plurality of isolated paths in a layer neighbors a vertex of a different one of the plurality of isolated paths by comparing distance therebetween to a threshold value. In some embodiments, the method can include determining vertices are neighbors by virtue of the distance between the vertices being below a threshold value In some embodiments, each of the plurality of toolpaths can include an infill toolpath that defines internal structure of the object. In some embodiments, each of the plurality of toolpaths can include a perimeter toolpath that defines surface features of the object. In some embodiments, the method can include restricting the defining the plurality of bridge paths to areas to be covered during additive manufacturing of the object according to one of the plurality of toolpaths.

In some embodiments, the method can include tracking whether a number of paths emanating from each vertex, including the plurality of isolated paths between the vertices and the plurality of defined bridge paths, is an odd number of paths, and in response defining an additional, different, bridge path from that vertex to a neighboring vertex or removing a previously defined bridge path.

In some embodiments, additively manufacturing the object can include additively manufacturing the object, using a deposition-based additive manufacturing machine, in a series of layers by a controller of the deposition-based additive manufacturing machine moving a deposition nozzle of the deposition-based additive manufacturing machine according to the additive manufacturing instructions. Here, the deposition nozzle follows a substantially continuous path during deposition of each of the layers of the series of layers, and deposition of each of the layers is substantially non-stop. In some embodiments, additively manufacturing the object can include additively manufacturing the object, using a deposition-based additive manufacturing machine, in a series of layers by a controller of the deposition-based additive manufacturing machine moving a deposition nozzle of the deposition-based additive manufacturing machine according to the additive manufacturing instructions. Here, the deposition nozzle follows a continuous path during deposition of each of the layers of the series of layers, and an extrusion rate of the deposition nozzle is reduced during deposition on the plurality of bridge paths.

In general, another innovative aspect of the subject matter described in this specification can be embodied in a deposition-based additively manufactured object that includes an infill structure defining the internal structure of the object. The infill structure has an infill pattern including a plurality of repeating discrete polygon shaped depositions. The repeating discrete polygon shaped depositions are bonded together. And, the infill structure includes a plurality of deposition bridges that connect the repeating discrete polygon shaped depositions strengthening the bonds between the repeating discrete polygon shaped depositions.

The foregoing and other embodiments can each optionally include one or more of the following features, alone or in combination. In particular, one embodiment includes all the following features in combination.

In some embodiments, traces of previously existing gaps between bonds of the repeating discrete polygon shaped depositions can be apparent, and the plurality of deposition bridges that connect the discrete polygon shaped depositions can be distinguishable from the bonds between the repeating discrete polygon shapes with traces of previously existing gaps.

In some embodiments, the infill structure can be CAD-defined. Here, the deposition-based additively manufactured object is a standalone structure configured for insertion into an enclosure as an infill core.

In some embodiments, the plurality of repeating discrete polygon shaped depositions each can include a plurality of vertices and a plurality of edges distinct from vertices and edges of other of the plurality of repeating discrete polygon shaped depositions. Here, the plurality of deposition bridges that connect the repeating discrete polygon shapes connect the plurality of vertices of one of the plurality of the repeating discrete polygon shaped depositions with the vertices of another one of the plurality of the repeating discrete polygon shaped depositions.

In some embodiments, the infill structure can be slicer-defined. Here, the deposition-based additively manufactured object includes a perimeter structure defining the surface geometry of the object.

In general, another innovative aspect of the subject matter described in this specification can be embodied in a system for deposition-based additive manufacture of an object. The system includes a slicing program that converts a representation of the object into additive manufacturing instructions that define a base toolpath that includes a plurality of discrete isolated paths, each isolated path having a plurality of vertices; and a toolpath revision program configured to output updated additive manufacturing instructions. The toolpath revision program is configured to add a plurality of bridge paths to the base toolpath and generate an updated toolpath. Each bridge path connects one of the plurality of vertices of one of the isolated paths to a neighboring vertex of a different one of the plurality of isolated paths. Additionally, the system includes a deposition system having a nozzle configured for deposition of material; and a controller for controlling the deposition system to sequentially form a plurality of layers in a configured pattern corresponding to the updated additive manufacturing instructions for the object.

The foregoing and other embodiments can each optionally include one or more of the following features, alone or in combination. In particular, one embodiment includes all the following features in combination.

In some embodiments, the representation of the object can be a stereolithographic representation. In some embodiments, the toolpath revision program can be part of the slicing program. In some embodiments, the toolpath revision program is configured to determine whether one of the plurality of vertices from one of the plurality of isolated paths neighbors a vertex of a different one of the plurality of isolated paths by comparing distance therebetween to a threshold value. In some embodiments, the toolpath revision program is configured to determine vertices are neighbors by virtue of the distance between the vertices being below a threshold value.

In some embodiments, the base toolpath can include an infill toolpath that defines internal structure of the object. In some embodiments, the base toolpath can include a perimeter toolpath that defines surface features of the object.

In some embodiments, the toolpath revision program is configured to restrict the adding of the plurality of bridge paths to areas to be covered in deposition during additive manufacturing of the object according to the base toolpath. In some embodiments, the toolpath revision program is configured to determine the updated toolpath based on the base toolpath and the added plurality of bridges. In some embodiments, the toolpath revision program is configured to count a number of paths emanating from each vertex of the plurality of vertices of the updated toolpath, and, in response to each vertex where the number of paths emanating from that vertex is an odd number of paths, the toolpath revision program is configured to add an additional bridge path to an unconnected neighboring vertex or remove a previously added bridge path. In some cases, the toolpath revision program is configured to determine the updated toolpath based on the base toolpath, the added plurality of bridges, and at least one of the additional bridge path and the removed previously added bridge path.

In some embodiments, the updated additive manufacturing instructions can include additive manufacturing instructions for each layer of the object. In some cases, the updated additive manufacturing instructions for each layer can instruct the controller to control the deposition system to move the nozzle and deposit material for each layer in a substantially continuous path. In some cases, the updated additive manufacturing instructions for each layer can instruct the controller to control the deposition system to move the nozzle, deposit material for each layer, and reduce extruder speed during bridge paths to less than average extruder speed during non-bridge paths.

In general, another innovative aspect of the subject matter described in this specification can be embodied in a method for additively manufacturing infill structure of an object. The method includes receiving additive manufacturing instructions for additively manufacturing the infill structure of an object in a series of layers according to an infill toolpath for each layer. The infill toolpath for each layer includes a plurality of polygon shaped paths connected by a plurality of bridge paths. Also, but for the plurality of bridge paths, the plurality of polygon shaped paths would be isolated from each other. The method further includes moving a deposition nozzle of an additive manufacturing machine according to the additive manufacturing instructions. The deposition nozzle travels in a continuous path during additive manufacture of each layer of the series of layers of the infill structure. Additionally, the method includes depositing material from the deposition nozzle of the additive manufacturing machine substantially non-stop during deposition of each layer of the series of layers of the infill structure.

In general, another innovative aspect of the subject matter described in this specification can be embodied in an apparatus for additively manufacturing infill structure of an object. The apparatus includes a communication system configured to receive additive manufacturing instructions for additively manufacturing the infill structure of an object by sequential deposition of material to form a plurality of layers in a pattern. The pattern includes a plurality of polygons connected by a plurality of bridge connections. Also, but for the plurality of bridge connections, the plurality of polygons would be isolated from each other. The apparatus further includes a deposition nozzle; and a controller configured to control the deposition nozzle to move the deposition nozzle along a substantially continuous path during deposition of each layer and deposit material from the deposition nozzle non-stop during deposition of each layer.

In general, another innovative aspect of the subject matter described in this specification can be embodied in a method of creating additive manufacturing instructions for a CAD-defined object. The method includes slicing, with a slicer, a CAD-defined object into a plurality of slices for additively manufacturing the object, a slice including a base toolpath having a plurality of vertices and a plurality of edges. The base toolpath includes a plurality of isolated paths among the plurality of vertices and the plurality of edges. The method further includes adding a plurality of bridge paths to the base toolpath to create a contiguous portion. Each bridge path connects one of the plurality of vertices from one of the plurality of isolated paths to a neighboring vertex from the plurality of vertices from a different one of the plurality of isolated paths. Additionally, the method includes identifying an improved toolpath of the base toolpath that includes a continuous sequence of traversal of the contiguous portion; and storing additive manufacturing instructions in memory based on the improved toolpath.

The foregoing and other embodiments can each optionally include one or more of the following features, alone or in combination. In particular, one embodiment includes all the following features in combination.

In some embodiments, the method can include determining whether one of the plurality of vertices from one of the plurality of isolated paths neighbors a vertex of a different one of the plurality of isolated paths by comparing distance therebetween to a threshold value. In some embodiments, the method includes determining vertices are neighbors by virtue of the distance between the vertices being below a threshold value In some embodiments, the base toolpath can include an infill toolpath that defines internal structure of the object. In some embodiments, the base toolpath can include a perimeter toolpath that defines surface features of the object.

In some embodiments, the method can include restricting the adding of the plurality of bridge paths to areas to be covered in deposition during additive manufacturing of the object according to the base toolpath. In some embodiments, the method can include counting a number of paths emanating from each vertex of the plurality of vertices in the contiguous portion. And, in response to each vertex where the number of paths emanating from that vertex is an odd number of paths, either adding an additional bridge path to an unconnected neighboring vertex or removing a previously added bridge path.

In some embodiments, the additive manufacturing instructions can include instructions to reduce extruder speed during the plurality of bridge paths to less than extruder speed during non-bridge paths.

In general, another innovative aspect of the subject matter described in this specification can be embodied in a method of creating additive manufacturing instructions for a representation of an object. The method includes slicing the representation of the object into a plurality of slices for additively manufacturing the object, a slice including a perimeter toolpath that defines the surface geometry of the object; and defining, in the slicer with a packing algorithm, an infill toolpath for each layer, the infill toolpath having a plurality of vertices and a plurality of edges. The infill toolpath includes a plurality of isolated paths among the plurality of vertices and the plurality of edges; The method further includes adding a plurality of bridge paths to each of the infill toolpaths to create a contiguous portion. Each bridge path connects one of the plurality of vertices from one of the plurality of isolated paths to a neighboring vertex from the plurality of vertices from a different one of the plurality of isolated paths. Additionally, the method includes identifying an improved toolpath of the base toolpath that include a continuous sequence of traversal of the contiguous portion; and storing additive manufacturing instructions in memory based on the improved toolpath.

The foregoing and other embodiments can each optionally include one or more of the following features, alone or in combination. In particular, one embodiment includes all the following features in combination.

In some embodiments, the method can include determining whether one of the plurality of vertices from one of the plurality of isolated paths neighbors a vertex of a different one of the plurality of isolated paths by comparing distance therebetween to a threshold value. In some embodiments, the toolpath revision program is configured to determine vertices are neighbors by virtue of the distance between the vertices being below a threshold value.

In some embodiments, the slice can include an inset toolpath.

In some embodiments, the method can include restricting the adding of the plurality of bridge paths to areas to be covered in deposition during additive manufacturing of the object according to the base toolpath. In some embodiments, the method can include counting a number of paths emanating from each vertex of the plurality of vertices in the contiguous portion. And, in response to each vertex where the number of paths emanating from that vertex is an odd number of paths, either adding an additional bridge path to an unconnected neighboring vertex or removing a previously added bridge path.

In some embodiments, the additive manufacturing instructions can include instructions to reduce extruder speed during the plurality of bridge paths to less than extruder speed during non-bridge paths.

The subject matter described in this specification can be implemented in particular embodiments so as to realize one or more of the following advantages. Connecting isolated paths can result in lowering the total time for additive manufacturing equipment to traverse the toolpath. Time savings generally results from reducing, minimizing, or eliminating altogether time associated with empty travel, including deceleration, deposition stop, empty travel itself, deposition start, and acceleration.

Further time savings can be realized by improving the continuous or Eulerian qualities of the toolpath. Some embodiments can significantly reduce total deposition time by adding a sufficient number of bridges to provide a fully-connected path that can be traversed by a continuous or Eulerian path that allows non-stop deposition during printer traversal of the toolpath, that is without having to stop or restart deposition for an entire layer. Some embodiments may include strategic reduction in extrusion speed during bridging movements to address or prevent overfilling. The system and method may include identifying some or all vertices with an odd number of edges after each or all bridge paths have been added. In response to a vertex with an odd number of edges being identified, the system and method can make an adjustment to remove a previously added bridge from that vertex or add an additional bridge to a neighboring vertex.

The system and method are particularly suited for enabling continuous deposition of each layer of infill structure of an object during additive manufacturing. In one embodiment, a toolpath generation system and method can generate an infill toolpath with a reduced number of isolated paths relative to a conventionally generated toolpath.

The present disclosure provides simple and effective systems and methods for toolpath generation that allow for printing of complex geometries while reducing or eliminating mid-infill print stops and starts. The systems and methods for toolpath generation can decrease the overall printing time and save energy via reduced printer running time when compared to conventional print time and energy use. Further, printed objects with infill bridges can provide increased object strength at a lower print time relative to objects printed without infill bridges.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIGS. 17A-B shows a CAD-defined lattice with a rectilinear grid pattern of one embodiment of the present disclosure.

FIGS. 18A-B shows a CAD-defined lattice with a honeycomb pattern of one embodiment of the present disclosure.

DESCRIPTION OF THE CURRENT EMBODIMENTS

Figure 9:
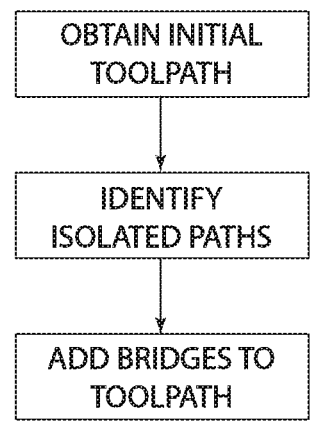
FIG. 9 shows a flowchart of one embodiment of a method of the present disclosure

As discussed herein, the current embodiments relate to a system and method for additive manufacture of an object with reduced total deposition time relative to a conventional process, as well as to the resultant additive structure itself. One embodiment includes adding bridges to the toolpath for an additive structure to provide a continuous toolpath for non-stop deposition during each layer of additive manufacture of the additive structure. Other embodiments include adding bridges to the toolpath for an additive structure to provide connection between isolated paths in each layer of the additive structure toolpath, including, in some embodiments to provide a partially, substantially, or fully connected path in each layer of the additive structure toolpath. Traversal of the toolpath with bridges can include reduced or minimized deposition time, for example by reducing or minimizing empty travel (i.e., start/stop movement of the additive manufacturing deposition equipment) during each layer of additive manufacture. More specifically, and with reference to FIG. 9, the method generally includes obtaining a toolpath (step 1), identifying isolated paths in the toolpath (step 2), and adding, to the toolpath, bridges that connect isolated paths (step 3). Each step is separately discussed below.

Figure 8:
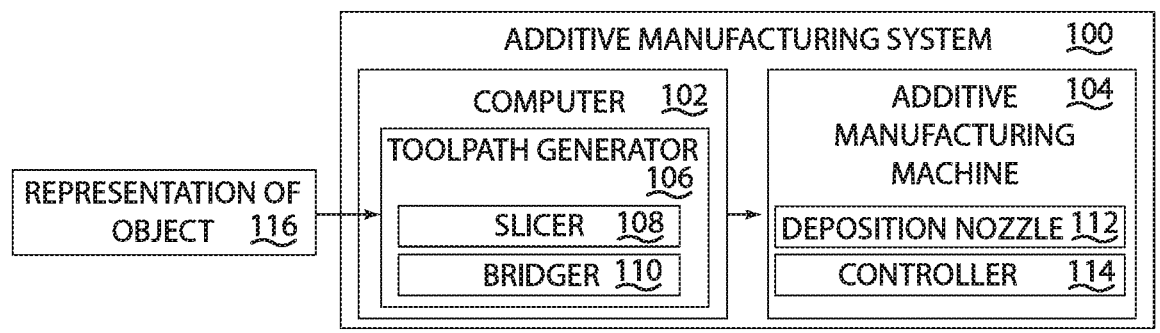
FIG. 8 shows a block diagram of one embodiment of a system of the present disclosure

An additive manufacturing system 100 in accordance with one embodiment of the present invention is illustrated in FIG. 8. The additive manufacturing system 100 generally includes a computer 102 and an additive manufacturing machine 104. Computers and additive manufacturing machines are generally well known and therefore will not be described in detail. Suffice it to say, computer or processor 102 can essentially be any hardware or combination of hardware, local, remote, or distributed, capable of receiving a representation of an object, executing a slicing algorithm or program on the representation, executing a bridge adding algorithm or program in accordance with an embodiment, and outputting or communicating toolpath adjustments, improved toolpaths, additive manufacturing instructions, or any combination thereof. Further, the additive manufacturing machine 104 can be essentially any additive manufacturing equipment that can generate an additive structure according to additive manufacturing instructions. In operation, the computer 102 receives a representation of an object 116 and a toolpath generator 106 slices the model 116 with a slicer and adds bridges with a bridger 110 to generate toolpaths for each layer of the object, which can be provided in the form of additive manufacturing instructions to the additive manufacturing machine 104. The bridger 110 can be configured to add bridges to base toolpaths from the slicer 108 that may or may not include sequencing information. The toolpath generator 106 can be a software program that executes on the computer 102. The slicer 108 and bridger 110 can be separate parts of one software program or can be stand-alone software programs that execute on the computer and can communicate directly with each other or indirectly, for example via files stored in memory on the computer. The controller 114 of the additive manufacturing machine 104 controls the deposition nozzle 112 according to the instructions to additively manufacture the object layer by layer. By virtue of the bridges being added to the toolpath, the controller 114 controls the deposition nozzle along a continuous path for each layer without having to stop the nozzles movement or the stop the flow of material out of the nozzle.

The current embodiments of the system and method can provide a reduction in total deposition time by reducing empty travel time. Empty travel time can be reduced by adding bridge connections between disconnected portions of the toolpath of each layer such that the deposition nozzle does not need to start and stop as often. In some embodiments, sufficient bridges are added to the toolpath for each layer such that the nozzle can travel in a continuous path for the entire layer without having to stop deposition of material from the nozzle. Because the deposition nozzle does not need to be stopped mid-deposition of a layer as often, if at all, there is less or no opportunity for material at the end of a disconnected path to be dragged by the nozzle during empty travel. Further, the resultant additive structure can be cleaner because there is less or no opportunity for material to ooze from the nozzle during empty travel. It is worth noting that a bridge connection, in this context, refers to a connection between two isolated paths. Bridging within the context of additive manufacturing sometimes refers to a horizontal overhang between two towers or vertical structures. Bridging is typically the term used when there is a gap under the overhang. For the avoidance of doubt, a bridge connection within the context of the current embodiments may or may not overhang a gap of material. A bridge connection here generally refers to the planar connection between two isolated paths within a single layer without regard to the material in the layers above or below.

Forming an additive structure includes any process in which a three-dimensional build, part, object, or additive structure is formed in successive layers according to one or more additive manufacturing techniques. The system and method discussed herein is particularly suitable for Big Area Additive Manufacturing (BAAM), however its application is not limited to BAAM, but rather it is applicable to essentially any additive manufacturing systems involving a discrete toolpath instead of creating entire layers at once. For example, suitable additive manufacturing techniques for us in conjunction with embodiments of the present invention include, by non-limiting example, direct energy deposition (DED), fused deposition modeling (FDM), welding-based systems, and essentially any other deposition-based additive manufacturing process. The additive structure may be formed according to other processes, whether now known or hereinafter developed. These and other additive manufacturing processes are used to form the additive structure, which can comprise essentially any three-dimensional geometry, including geometries having overhangs, undercuts, and internal volumes.

The additive structure can be formed with essentially any material or combination of materials used in additive manufacturing. This can include additive manufacturing materials now known or hereinafter developed. The current embodiments are particularly suitable for any additive process that works by deposition including deposition of metal (both powder and wire), thermoplastics, thermosets, composites, and other materials. Examples of deposition materials can include, but are not limited to, rubber, silicone, carbon fiber, and glass fiber.

Obtaining a Toolpath

One embodiment of a method in accordance with the present invention generally includes obtaining a toolpath. This can include obtaining a completed toolpath from a toolpath generation method (e.g., a slicer-defined infill toolpath) or creating a toolpath from a representation of an object, such as from a CAD or STL file (e.g., a CAD-defined infill toolpath). The toolpath can include a series of layer toolpaths that together form additive manufacture instructions for an object, such as a G-Code file.

Obtaining a toolpath may include designing or obtaining a design or representation of an object, for example by obtaining or generating a CAD file. A CAD file can be generated with CAD software, such as Solidworks, Fusion 360, or Rhino, to name a few well-known CAD software platforms. CAD software provides many tools that allow for creation of models of complex structures as well as assemblies of multiple parts. A raw CAD file can store all the original data from the object design including, for example, curvatures such as arcs and splines. In order to prepare the CAD file for additive manufacture of the object, typically the CAD file is converted or exported into a stereolithography (STL) file, which can also be included in the step of obtaining a toolpath. An STL file typically uses triangles to approximate the surfaces of the CAD file.

Obtaining a toolpath may include converting a representation of an object into additive manufacturing instructions, such as G-Code. A slicing program (or toolpath generator) is a program that divides an STL file (or other representation of the object, such as represented by a CAD file) into layers, known as slices, and then creates toolpaths for each layer, which are stored as G-Code (or another form of additive manufacturing instruction). G-Code is one form of output of slicing software that can be loaded into a 3D printer to instruct it how to build an object. Slicing is well known and therefore will not be discussed in detail. Suffice it to say, slicing typically involves intersecting a horizontal plane with a representation of an object, such as is stored in an STL file, and continuously moving the plane vertically by a single layer height until the entire part has been sliced. Each time the plane meets the edge of a triangle in the STL file, a point or vertex is created. All the vertices together form a polygon, or polygons, that act as the boundary, or boundaries, for that layer. From there, the slicer fits toolpaths to each polygon to form the layer. The size of the toolpaths and how they are generated can be determined based on various settings.

Figure 19:
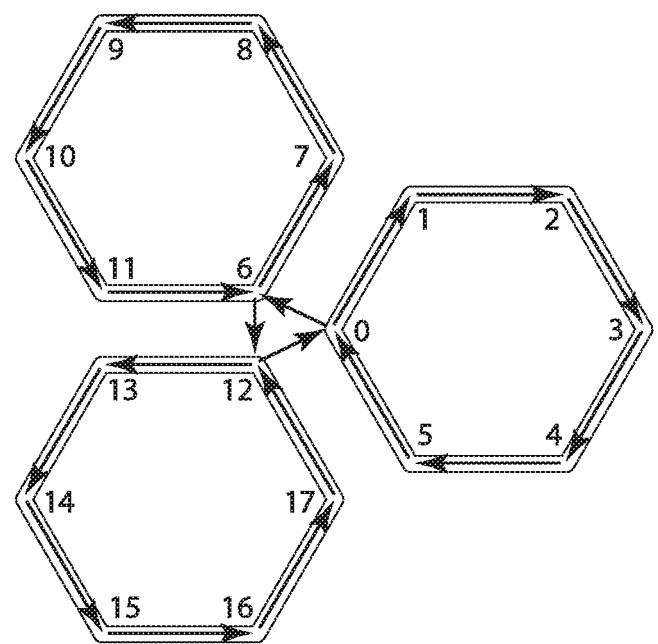
FIG. 19 shows a graph representation of a toolpath.

It is worth noting that a toolpath typically includes position information, but may or may not include sequencing information. For example, a toolpath can refer to the location and sequence of deposition, or to just the location of deposition. Further, a toolpath can be described as a graph, referencing the term from the mathematical area of graph theory. A graph is generally represented by vertices and line segments or edges between those vertices. For example, FIG. 19 shows a toolpath that can be described as a graph with vertices labeled 0-17 and edges that can be referred to by any two vertices (e.g., the four edges of the 6 vertex are 6,7 edge, 6,11 edge, 6,12 edge, and 6,0 edge). Graph theory terminology can be helpful in describing, defining, or obtaining a toolpath. For example, a toolpath may be represented by a graph and the sequence of the toolpath can be represented by the sequence of visits of the vertices and/or edges. With reference to FIG. 19, one toolpath sequence is illustrated with arrows. Where a toolpath does not have any isolated paths, it can be described as closed, fully connected, or contiguous, referencing similar terminology from graph theory, such as the toolpath depicted in FIG. 19. Graph theory can be helpful in describing toolpaths because there are graph theory terms that describe particular types of paths. For example, a Eulerian path refers to a path that visits every edge exactly once, allowing for revisiting vertices, again as shown in FIG. 19. In addition, graph theory's Chinese postman problem or route inspection problem to find a shortest closed path that visits every edge can be applied to obtaining sequencing for an additive manufacturing toolpath.

Typically, perimeter moves are the first to be generated during the slicing process, and they are created by offsetting the boundary polygon inward by one bead width. Following the perimeters are the insets, which can also be created by offsetting the original polygon, minus the perimeter region, inward by one bead width. After all perimeters and insets are generated, the remaining area, which sometimes includes multiple regions, is designated as infill. The infill region can be filled using a variety of methods, including embodiments of the system and method of the present disclosure described herein. It is worth noting that although some of the current embodiments of the present disclosure are suitable for generating infill toolpaths, other embodiments of the present disclosure are equally suitable to generate an inset and/or perimeter toolpath or an entire layer toolpath. That is, embodiments of the present disclosure are suitable for use in connection with both slicer-defined infill as well as CAD-defined internal structures, such as CAD-defined infill. A CAD-defined internal structure may be infill, but be generated based on surface features because the representation is purposely created as an internal structure. In such a situation, after slicing, the toolpath may be a perimeter toolpath or perimeter and inset toolpath, without an infill toolpath. The embodiments of the present disclosure provide a system and method for traversing a path with additive manufacturing equipment that reduces, minimized, or starts/stops. Accordingly, the embodiments are suitable for essentially any path type as long as the representation of the object (e.g., CAD model) is designed appropriately. For example, an infill structure can be modeled in CAD and the algorithm can create toolpaths based on the CAD model, e.g., by virtue of the CAD representation of the infill being sliced by a slicer. Alternatively, an infill structure can be defined by the slicer itself according to a pattern, fill percentage, and other parameters and the algorithm can create toolpaths based on the slicer-defined infill (as opposed to CAD-defined infill in the previous example).

Put simply, infill can be slicer-defined or CAD-defined. Infill generally refers to material that fills or is used to fill a space or hole. Slicer-defined infill is infill that is not defined by the CAD file's internal structure, but instead by slicer set parameters in combination with the CAD defined perimeter. CAD-defined infill is essentially a stand-alone internal structure that is used as infill or internal structure for another structure. Oftentimes, but not always, CAD-defined infill has a lattice structure. CAD-defined infill doesn't make use of slicer infill definition because the perimeter and insets themselves define the internal, typically lattice, structure. Because sliced lattice structures typically generate quite a few perimeter and inset isolated paths, CAD-defined infill typically is particularly suitable for use with embodiments of the present disclosure.

Figure 14:
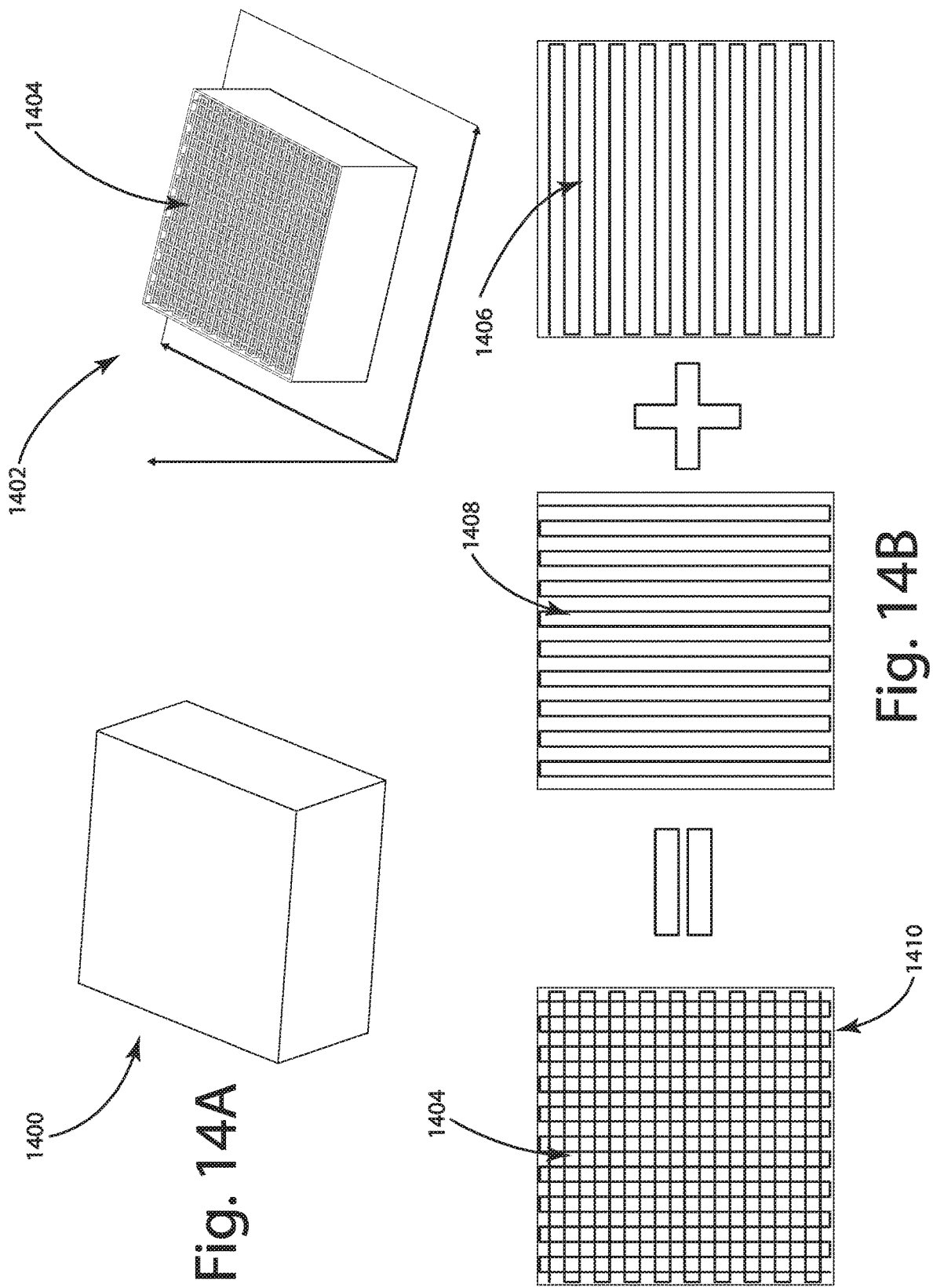
FIGS. 14A-B show different views of a conventional slicer-defined lattice.
Figure 16:
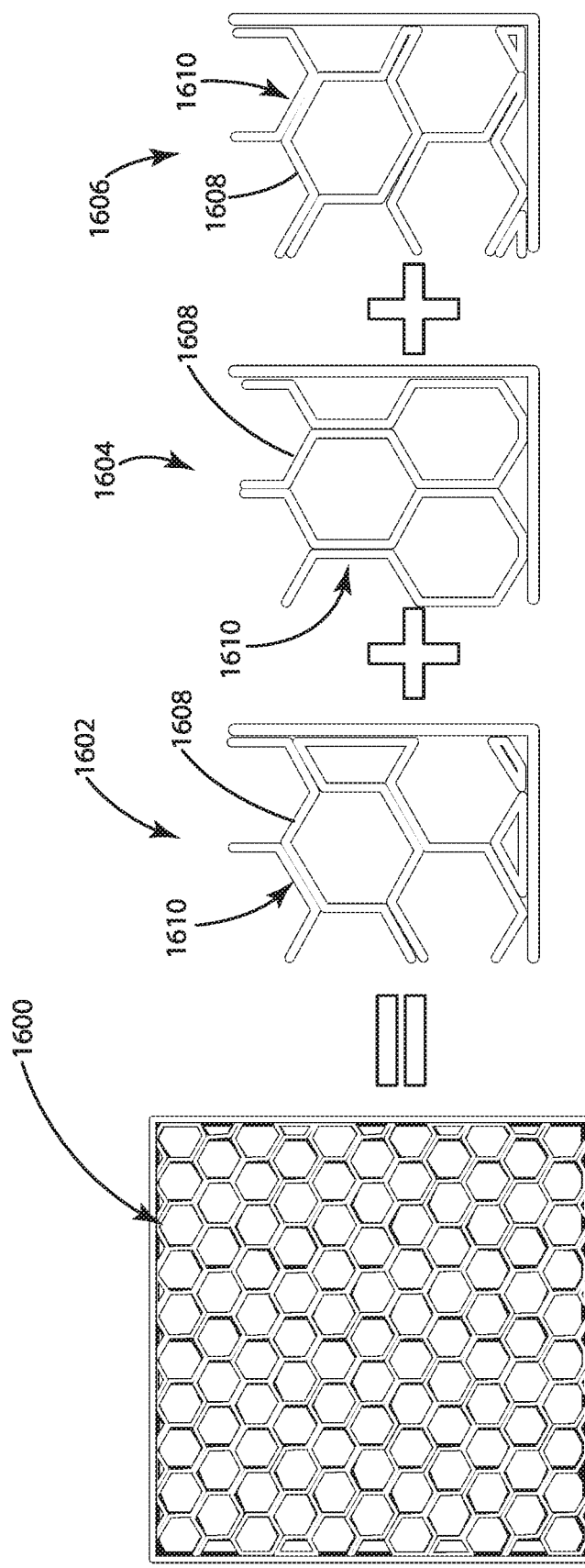
FIG. 16 shows different views of a conventional slicer-defined lattice.

Slicer-defined infill structures do not exist in the original CAD file or in the STL file because they are defined and generated by the slicer. Slicer-defined lattice infills sometimes can be generated by a simple continuous toolpath for each layer such as the snake patterns, as shown, for example, in FIGS. 14A-B. In FIG. 14A, a representation of an object in CAD 1400 is subject to slicing 1402 where a slicer-defined infill toolpath for each layer is determined by the slicer. The depicted infill structure 1404 is a lattice rectilinear grid that is formed by alternating layers that have a continuous path of horizontal lines 1406 and a continuous path of vertical lines 1408. The vertical 1408 and horizontal 1406 layers repeat and in total form the rectilinear grid 1404 shown in the top view 1410 of FIG. 14B. For other infill patterns, conventional slicer-defined infill generally utilizes isolated paths. For example, FIG. 16 illustrates a slicer-defined honeycomb lattice infill 1600. The infill structure 1600 is a combination of three repeating layer infill patterns 1602, 1604, 1606. The slicer-defined layer toolpaths of each layer includes a number of isolated paths. In general, each depicted isolated path forms multiple polygon shapes, with the exception of toward the perimeter where there are some remnant paths.

Figure 15:
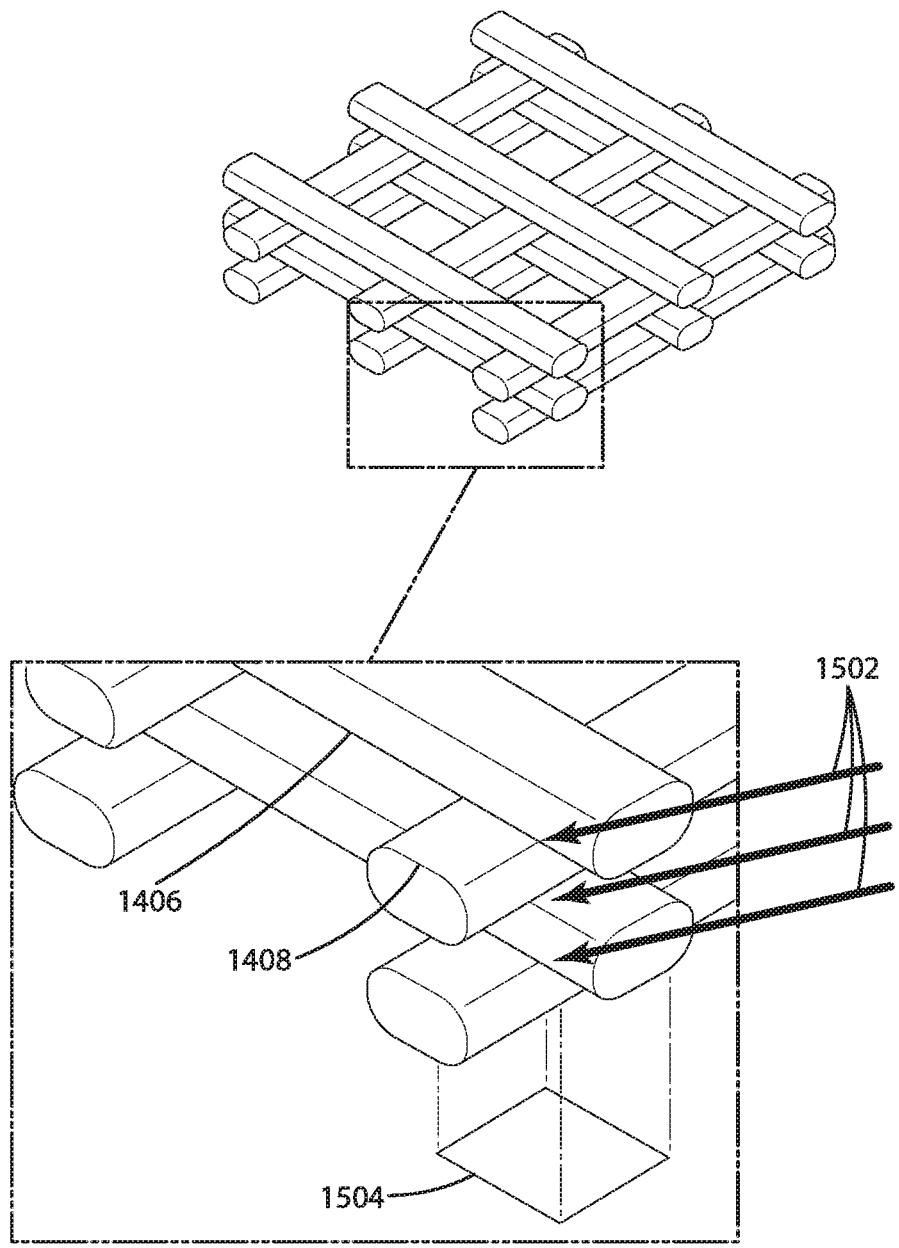
FIG. 15 depicts interlayer bonding of the lattice of FIGS. 14A-B.

While slicer-defined infill structures can have continuous toolpaths for each layer, the resultant slicer-defined infill structures frequently have an issue with inter-layer bonding because of the lack of bonding areas, as shown in FIG. 15. Specifically, the interlayer bonding locations 1502 in the slicer-defined rectilinear grid lattice of FIG. 14 have a small interlayer bonding area 1504. Similar issues are present in other known slicer-defined infill structures that do not have continuous toolpaths, such as the slicer-defined honeycomb infill structure 1600. The bead for each layer 1602, 1604, 1606 forms a single border 1608 between some honeycombs while forming a double border 1610 between others. Then, this pattern shifts between the three layers. Accordingly, the interlayer bonding is weak because of how the honeycomb borders on consecutive layers do not match up. In addition, known slicer-defined infill structures generally have a uniform grid pattern that does not account for variable stress. Embodiments of the present disclosure can be applied to slicer-defined infill structures. Polygons formed by slicer-defined infill can have bridges added at one or more vertices to connect to one or more vertices of neighboring polygons. For example, the isolated paths that form the honeycomb patterns of FIG. 16 can be connected by bridges in accordance with the present disclosure. It should also be understood that where a system and method of the present disclosure is incorporated into or forms a slicing program, the process of generating a toolpath and adding bridges need not be separated as such where a toolpath is generated and bridges are added to the completed toolpath, but rather the slicer can be programmed to add bridges as the initial toolpath is generated.

CAD-defined internal lattice structures with added bridges have stronger inter-layer bonding strength than slicer-defined infill, as is evident from the examples shown in FIGS. 17A-B and 18A-B. Specifically, FIG. 17A shows a CAD-defined rectilinear grid lattice 1700 being subject to slicing 1702 and FIG. 17B shows how each layer toolpath 1704, 1706, 1708 of the sliced CAD is generally the same and therefore has ample inter-layer bonding area, that exceeds the inter-layer bonding area in the configuration shown in FIG. 15. One embodiment of a system and method of the present disclosure can include a graph modifier that modifies the toolpaths 1706, 1708 of the sliced CAD layers by adding bridges and a path optimizer (for example, a Chinese postman algorithm) that optimizes the path of the modified toolpath/graph. Together, the entire process of obtaining a slice from a known slicing algorithm, modifying the graph of each layer with a graph modifier, and optimizing the path with a path optimizer can be referred to as a slicer or toolpath generator. Further, the slicing, graph modifying, and path optimization can be carried out by one or more computer programs, such as a processor or computer 102 from FIG. 8. The different functions can be part of the programming of the toolpath generator, for example part of the slicer 108 or bridger 110. Toolpath generator 106 may be referred to as a slicer or improved slicer. FIG. 18 shows a similar case for a CAD-defined honeycomb lattice structure 1800 being subject to slicing 1802 and each layer toolpath 1804, 1806, 1808 of the sliced CAD is generally the same and therefore has ample inter-layer bonding. The CAD-defined lattices 1700, 1800 do not include bridges. When sliced, known slicing algorithms tend to create isolated paths around the polygon shapes (e.g., isolated square paths and isolated honeycomb paths). During or after slicing, bridges can be incorporated into the toolpath in accordance with an embodiment of the present disclosure, as will be discussed in more detail below. That is toolpaths 1704, 1706, 1708 and 1804, 1806, 1808 can have bridges added to the toolpaths.

While CAD-defined internal lattice structures can be used with conventional slicing, graph (e.g., toolpath) modification, and path optimization, a similar approach can be achieved with a slicer-defined lattice structure. In one embodiment, the infill algorithm provides infill layer slices akin to those of the CAD-defined internal lattice structures—from there, the approach can be the same, bridges can be added with graph modification and then a toolpath can be identified with a path optimization algorithm. It is also worth noting that graph modification to add bridges and path optimization can also be performed on conventional slicer-defined infill toolpaths. While some continuous conventional slicer-defined infill toolpaths exist many other conventional slicer-defined infill toolpaths are not continuous and instead include isolated paths. For example, the slicer-defined path shown in FIG. 16 has isolated paths. Adding bridges can generally benefit conventional slicer-defined infill toolpaths that have a mesh of polygon shapes by filling corner gaps, and therefore, can increase the planar-direction bonding. In addition, adding bridges to slicer-defined infill toolpaths that have isolated paths, such as isolated paths that create closed loops to form polygons, can reduce deposition time and enhance bonding.

One conventional way of generating an infill toolpath is to keep offsetting the boundary polygon inward until nothing of the infill region remains. This is sometimes referred to as concentric infill. Other conventional infill patterns rely on overlaying a grid of points on the infill region and clipping the grid of points to fit. The points can then be connected to form different geometric patterns such as parallel lines or honeycombs.

The process of generating a toolpath can be repeated for each layer and the resultant toolpaths can be translated into G-Code. The G-Code can include a variety of commands, such as the speed of the machine, positions for each axis, speed of the extruder, to name a few. G-Code can be stored as a text file and exported from the slicer so that it can be loaded into the printer.

Bead, or extruded material, width can be a factor in toolpath generation. Bead width may be adjusted or selected such that toolpaths generated are an exact or substantial multiple of the bead width. The slicing software can use bead width settings, for example input by the operator, to fit toolpaths according to constraints of the representation of the object. For example, a 0.3 inch diameter nozzle may provide an input bead width of 0.34 inches. This contrast can perhaps best be seen in FIG. 1A where the extruder path 12 of the nozzle is shown in solid lines while the shaded regions represent the resultant beads 14 having a particular bead width. Therefore, if the desired wall thickness is 4 inches, the wall thickness could be changed to either 3.74 inches or 4.08 inches to account for the input bead width value. If the wall thickness were kept at 4 inches, the slicing software typically would place six closed-loop paths in the space, and the center most beads would overlap by 0.08 inches to keep the part at 4 inches. The overlap in the middle can cause overfilling that can build up layer after layer potentially causing issues.

For deposition-based additive manufacturing, bead width is typically determined in large part by the nozzle diameter of the printer head. Bead width can also be adjusted in other ways, for example by adjusting the print or extruder speed. Extruder or print speed can be adjusted in a variety of different ways, for example by adjusting the movement speed of the nozzle and/or the feed rate of the material being extruded through the nozzle. Embodiments of the present disclosure are suitable for use in connection with both small and large scale additive manufacturing. By way of example, common nozzle sizes for small-scale 3D printers varies from about 0.25 mm to 1 mm and nozzle sizes for large-scale printing such as BAAM generally vary between 0.1 inches to 0.4 inches.

It can be helpful to understand the difference between inset, infill, and perimeter. In general, the perimeter bead is the first inset bead. An inset is generally an offset of the outer perimeter toward the center of the part. The infill is described as the volume filled in between the inner and outer perimeters. By adding more insets to a part, less volume is needed to fill with infill.

Referring to FIGS. 1-4, the step of adding bridge connections to a toolpath will now be described in more detail. FIG. 1A shows a portion of a toolpath for one layer of an infill pattern. The depicted toolpath of FIG. 1A can be obtained from a conventional slicing technique. Although a polygon lattice structure is depicted in FIGS. 1A-1B, application of the method is not so limited. The method can be applied to essentially any toolpath that includes isolated paths. Further, although the depicted pattern is an infill pattern, the process can also be applicable to inset pattern toolpaths, for example a CAD model with a lattice structure of apertures likely will also produce a toolpath that includes isolated paths because many slicer algorithms generate closed-loop boundary paths around apertures.

Figure 1A:
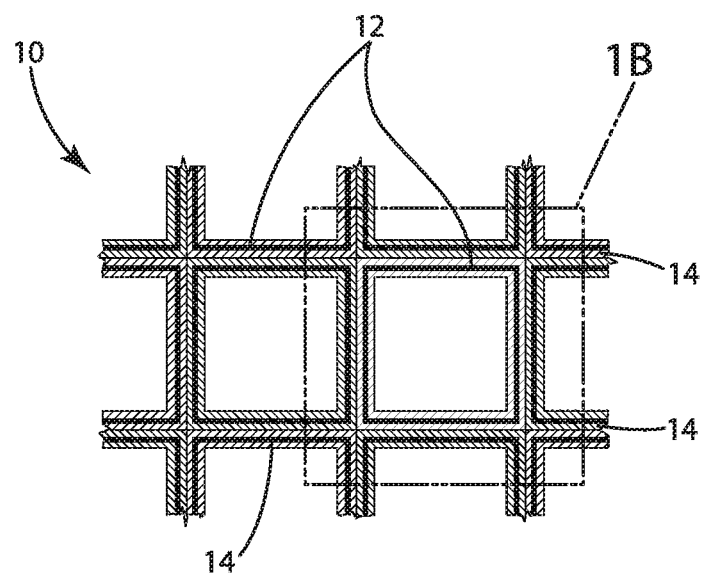
FIGS. 1A and 1B show a visual representation of an additive manufacturing toolpath with isolated paths from neighboring paths.

Toolpath 10 is shown in FIG. 1A. While a visual representation of the toolpath is depicted to aid in explanation of the method, it should be understood that the toolpath can be represented in a variety of different formats or protocols. For example, the toolpath can be represented by a toolpath file that includes additive manufacture instructions. G-Code is a popular and fairly standard format for toolpath instructions. The toolpath instructions can instruct the printer where to move, how fast to move, how much material to deposit, what temperature to use, and essentially any other suitable information for use in additive manufacture.

Figure 6A:
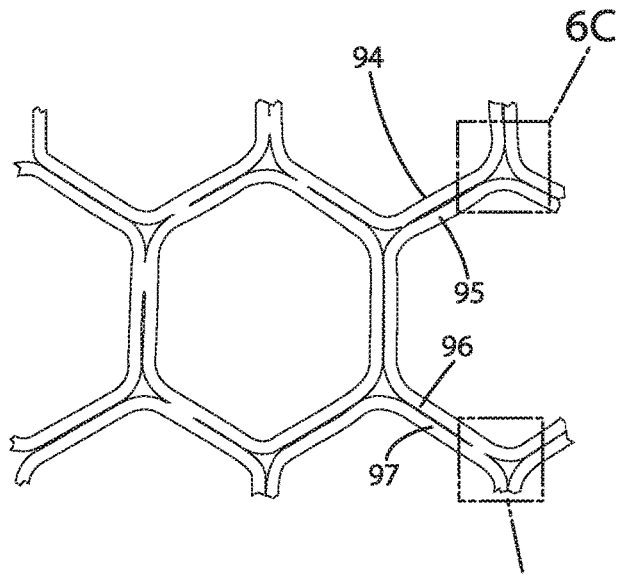
FIGS. 6A-D shows a portion of an additive structure generated from instructions produced by a conventional slicing method.
Figure 6C:
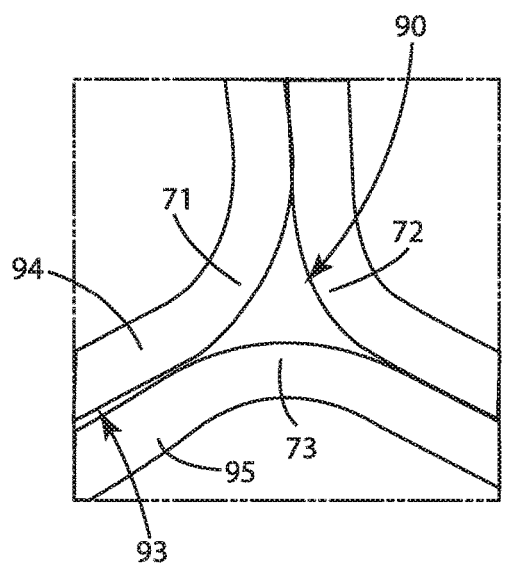
Figure 6B:
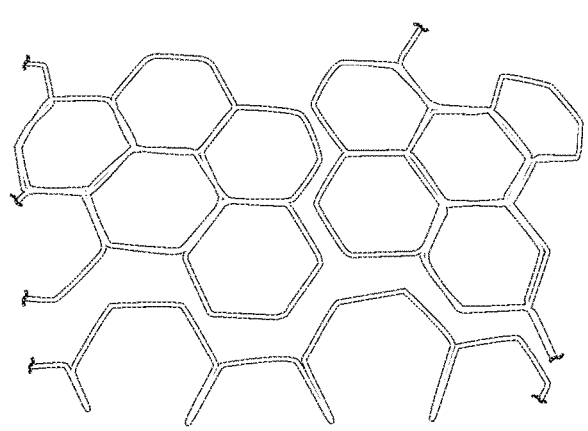
Figure 6D:
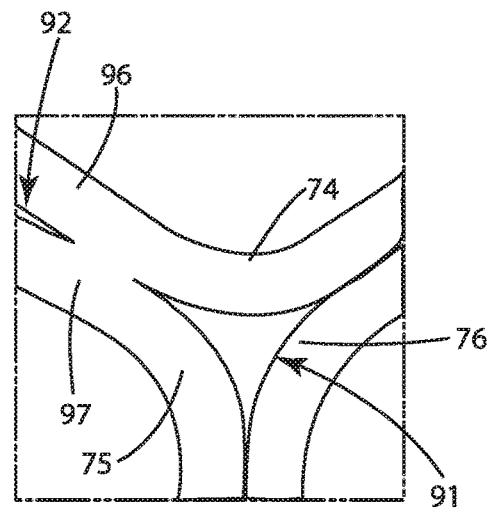

Toolpaths created by conventional slicing algorithms often generate toolpaths that include many isolated paths. More specifically, the toolpaths created typically include discrete isolated polygon paths. This is because, in general, slicing algorithms tend to prefer that the printer make a complete boundary around any open area. Further, when the deposition width is greater than a single bead, the toolpath includes adjacent edge traversal in order to provide an appropriate deposition width. This can result in small gaps between the resultant polygon shapes, such as illustrated in FIG. 6A. In addition, a general desire for closed-loop paths around open areas in combination with a general desire to minimize the amount of material deposited, often leads to isolated paths of the type shown in FIGS. 1A and 2A. To be more specific, the general goal of conventional toolpath generation is to fill the target areas with deposition—once the area is filled, there is no need to add additional deposition paths. A honeycomb based infill toolpath that includes isolated paths is also evident in FIG. 6A from the shape of the deposited material and the gaps 90, 91, 92. FIGS. 6C and 6D show close-ups where three honeycomb or hexagon shapes meet and the gaps 90, 91 are more pronounced. In some embodiments, the toolpath can be restricted to a toolpath that is an exact multiple of bead width, such that traversal of the toolpath involves multiple adjacent nozzle traversals to achieve a deposition thickness that is a multiple of the bead width. The embodiment may include adjusting or selecting bead width such that the bead width is at least half (or another multiple of) the width of the lines composing the infill pattern, such as any given lines of a polygon infill pattern.

Identifying Isolated Paths

Figure 1B:
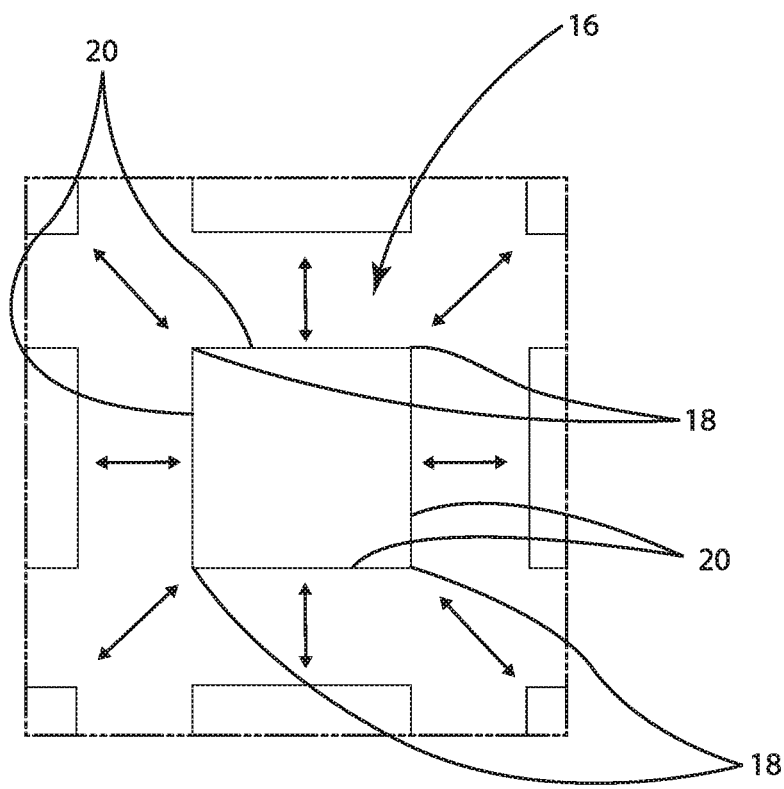

After a toolpath is obtained, for example from a conventional slicing technique or as a sub-step of a toolpath generation system and method of the present disclosure, the depicted embodiment of one embodiment of a method of the present disclosure includes identifying isolated paths, also referred to as disconnected paths or path lines, for example as shown in FIGS. 1A-1B. For example, the method can include analyzing the toolpath to identify toolpath movement that would force the printer to slowdown, stop deposition, empty travel, deposition restart, and accelerate movement. The extruder paths 12 in FIG. 1A illustrate the instructed path of the printer nozzle and where the printer nozzle is instructed to deposit material, while the shaded regions 14 surrounding the extruder paths 12 indicate the expected resultant beads 14 and their bead width. In FIG. 1A there are 12 isolated or disconnected extruder paths depicted. Accordingly, were this toolpath printed, it would result in 12 discrete beads 14 being deposited.

There are a variety of different ways to identify isolated paths of a toolpath. The additive manufacturing instructions that define the toolpath may include information about the isolated paths, such as the number and specific location of the isolated paths. A bridger or bridge connection program may include programming that accepts G-Code or other additive manufacturing instructions that analyzes the toolpath for each layer and automatically identifies the isolated paths by identifying where the G-Code instructs the printer to empty travel or other nozzle characteristics, such as one or more of deposition stop, nozzle movement deceleration, nozzle movement stop, nozzle movement start, nozzle movement acceleration, or deposition start. In another embodiment, the bridger may include graph node analyzing programming that converts the G-Code instructions to a graph node of nozzle movements and then automatically identifies the empty travel or other nozzle characteristics from the graph node analysis. In yet another embodiment, the bridger may produce a visual or other user interface that depicts the toolpath and allows the user to identify some or all isolated paths. The bridger may produce a visual or other user interface that automatically depicts the toolpath including all isolated paths identified by the bridger and allow the user to de-select certain isolated paths, not to be modified by the bridger.

Adding Bridge Connections

One or more bridge connections can be added in a variety of different ways. For example, adding bridge connections can include modifying a toolpath generated by a toolpath generator, modifying a toolpath before or after an initial sequence of deposition is defined, modifying toolpath generation programming, modifying additive manufacturing instructions that define a toolpath, or modifying the additive manufacturing machine programming.

The method can include adding essentially any number of bridge connections to a toolpath and can include adding one or more bridge connections to multiple toolpath layers such that each of the layers can be additively manufactured without empty travel or with substantially reduced empty travel. That is, the bridge connections can provide a continuous toolpath for the printer to follow during non-stop (or substantially non-stop) deposition on each layer.

Figure 2A:
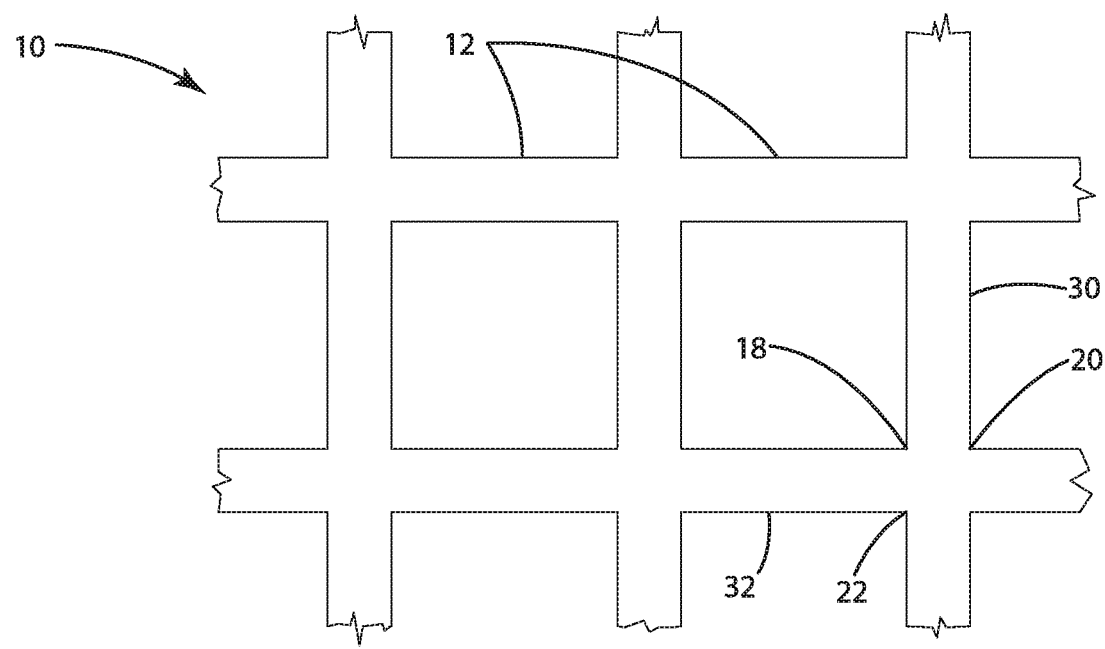
FIGS. 2A and 2B show adding bridge connections between disconnected path lines.
Figure 2B:
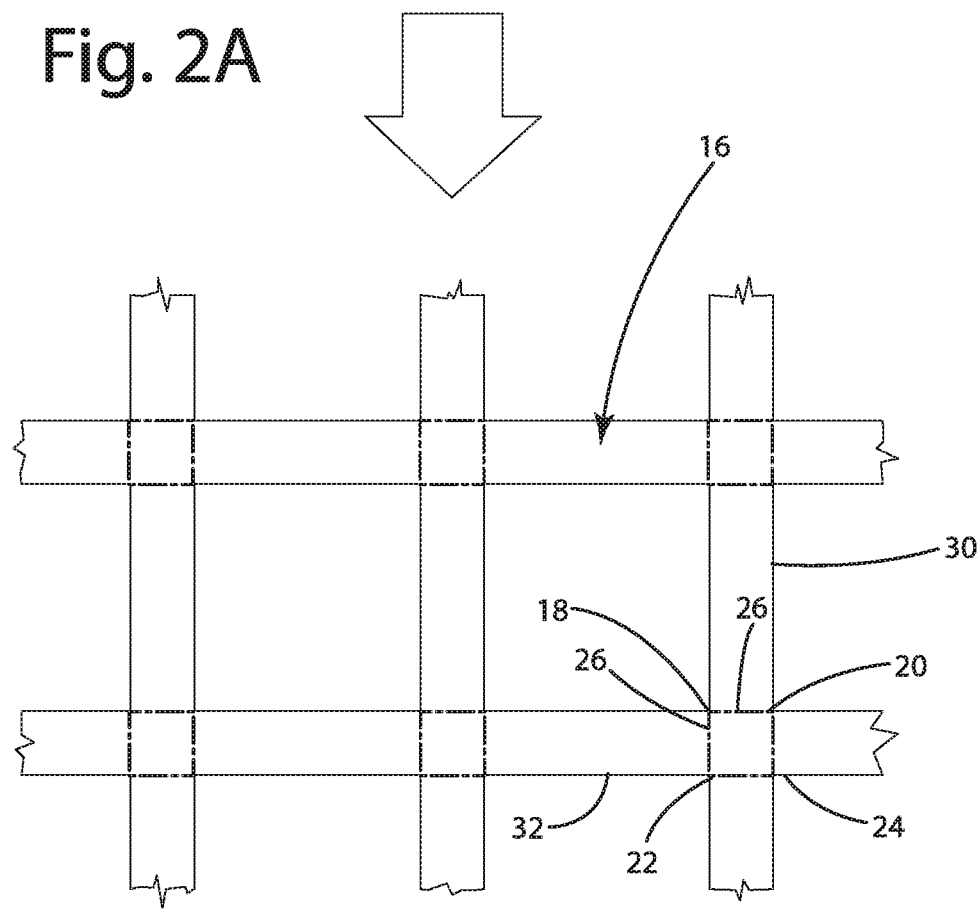
Figures 4A, 4B:
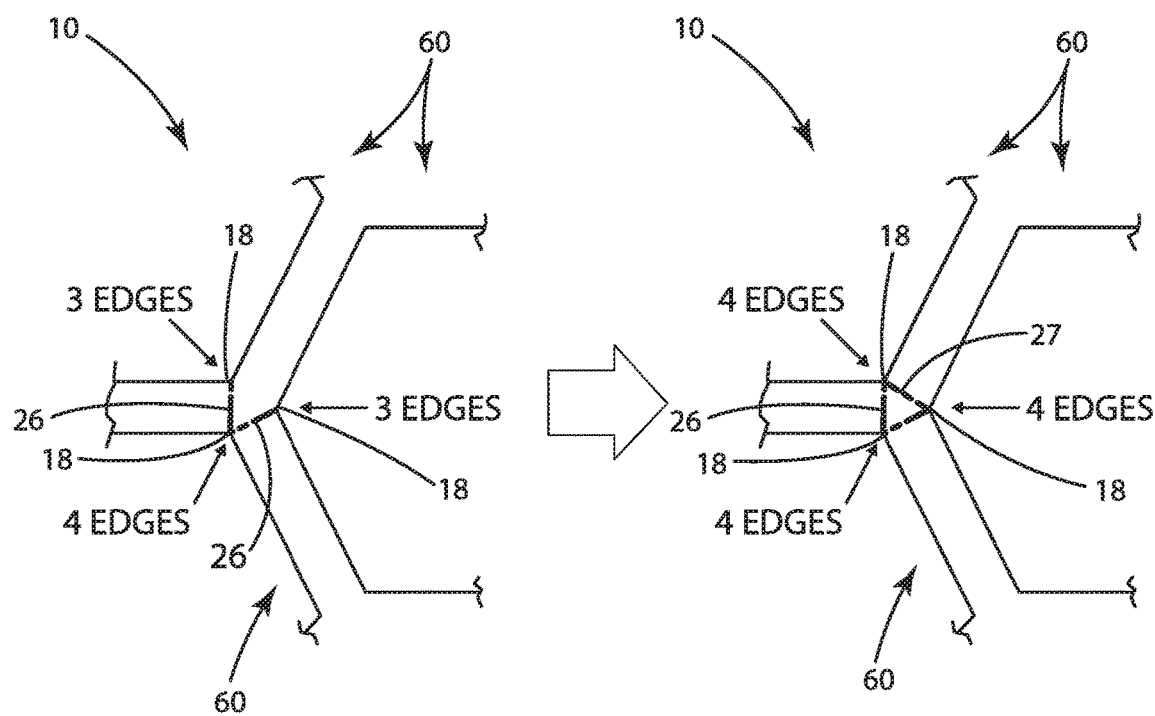
FIGS. 4A and 4B show edges associated with vertices changing as a bridge connection is added.
Figure 13:
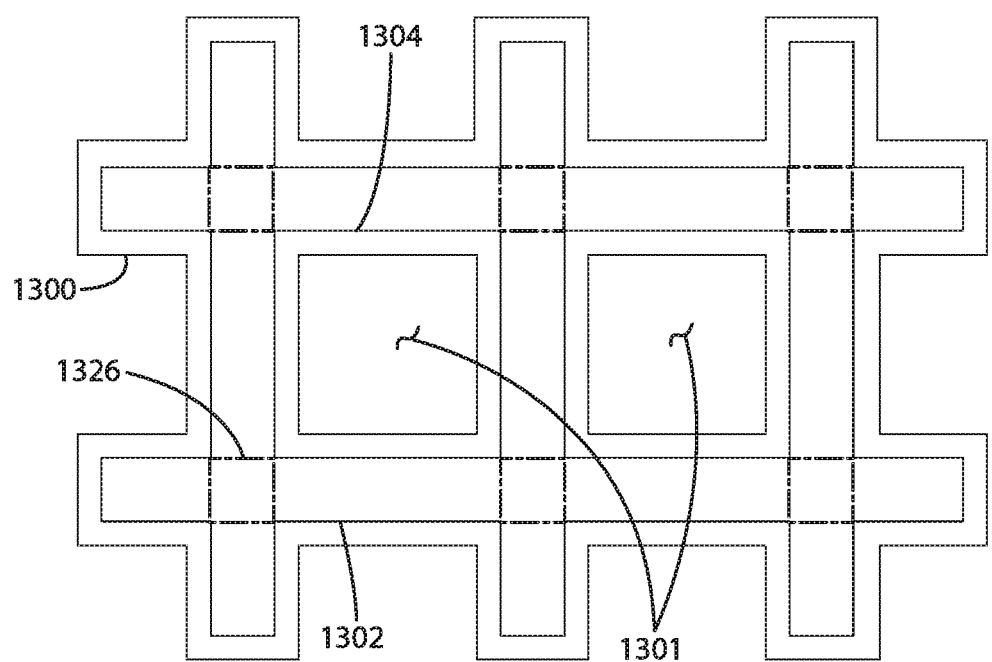
FIG. 13 shows a visual representation of an additive manufacturing toolpath with three formerly isolated paths connected by bridges.
Figure 20:
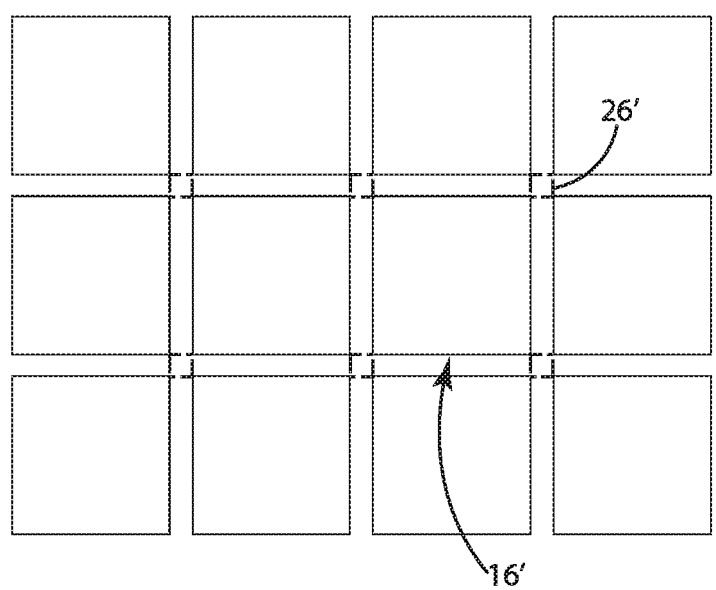
FIG. 20 shows another embodiment of a toolpath with bridges added.

To aid in explanation, bridge connection additions to the isolated path 16 shown in FIG. 1B will be discussed in detail. The current embodiment of the method connects the isolated path 16 to neighboring isolated paths by adding bridges as shown in FIGS. 2A and 2B. An isolated path 16 is composed of multiple vertices 18 that are connected by edges 20. In the depicted embodiment, the isolated path 16 has four vertices 18 and four edges 20, isolated paths in other embodiments may have a different number of vertices and edges. An isolated path can form a geometric shape or other geometric object, such as the square pattern of isolated path 16 shown in FIGS. 1A-B or partial-honeycomb pattern of isolated paths 60 as shown in FIGS. 4A-B. Referring to FIGS. 1A-B, there is a gap, indicated by the double-headed arrows, between the isolated path 16 all eight of the neighboring toolpaths, which themselves are all isolated paths. By way of example in reference to FIGS. 2A-B, each vertex 18 of the isolated path 16 can be connected to a neighboring vertex of a different isolated path. As an example with reference to FIGS. 2A-B, vertex 18 is connected to neighboring vertices 20, 22 by two separate bridge connections 26. By connecting vertex 18 and 20 the isolated path 16 is connected to the isolated path 30 and by connecting vertex 18 and 22 the isolated path 16 is connected to the isolated path 32. By virtue of those two bridge connections alone, the isolated paths 16, 30, 32 would form a single path, which itself is isolated from the other disconnected paths in the toolpath on this layer. With all of the depicted bridge connections shown in FIG. 2B in place, the entire toolpath forms a single contiguous path in that the entire toolpath is fully connected and no paths are isolated or unreachable from any other paths. This may also be referred to as a connected graph. To the extent that the toolpath of FIG. 2B illustrate a portion of a repeating pattern of full square closed-loop patterns, the toolpath is not only contiguous, but continuous. For example, as shown in FIG. 20 where the path 16' and the other formerly isolated paths are shown connected by virtue of bridge connections 26'. That is, FIG. 20 shows where the repeating pattern of FIG. 2B includes twelve squares (instead of partial square patterns for the ten perimeter squares), which means once fully connected with bridge paths the toolpath is Eulerian because the entire path can be traversed without traversing any edge more than one time. Further, were the depicted portion of FIG. 2B the entire pattern, additional bridge paths can be added in order to make the toolpath continuous or Eulerian, for example by adding bridges connecting neighboring vertices at the perimeter. An example of this is shown in FIG. 13. It is worth noting that the method may or may not mandate the number of bridge connections. In the embodiment shown in FIG. 2B each vertex includes two bridge connections to a neighboring path. However, in alternative embodiments, there may be fewer or additional bridge connections. For example, with reference to FIG. 2B, there could be a diagonal bridge connection between vertex 18 and vertex 24 in addition to or instead of one or both of the depicted bridge paths.

While FIGS. 2A-B illustrate bridges being added to a small section of a large grid lattice structure, FIG. 13 shows a complete structure where the outline 1300 defines the top view of the original CAD model that is in the shape of a grid lattice structure with holes 1301. A conventional slicing algorithm may generate three isolated toolpaths 1302, 1304, 1306 that include a toolpath 1302 based on the perimeter of the structure, and two separate isolated paths 1304, 1306 that bound the holes 1301. When bridges 1326 are added to connect the isolated paths 1304, 1306, 1301, a contiguous toolpath is formed and toolpaths 1302, 1304, 1306 are no longer isolated from each other. Further, because all of the vertices have an even number of edges, a Eulerian or continuous toolpath can be identified. It is worth noting that the type of toolpath, e.g., perimeter, infill, inset is immaterial. The algorithm need not distinguish or differentiate if the path line is perimeter, inset, or infill, it can treat all path lines equally. For labeling purposes, it may be appropriate to refer to the continuous toolpath as a perimeter toolpath because it defines the surface geometry of the object.

Identifying neighbors can be included in identifying isolated paths or adding bridges. Vertices can be identified as neighboring or in the same neighborhood using essentially any suitable method. The same is true of paths, including isolated paths. Generally, two vertices can be considered neighbors if they are within a threshold distance of each other. Similarly, two isolated paths are generally considered neighbors if at least one vertex from each path are within a threshold distance of each other. A group of isolated paths may be considered within the same neighborhood if they each have at least one vertex that is within a threshold distance of at least one vertex from each of the other isolated paths in the group. Similarly, a group of vertices may be considered within a neighborhood if each vertex is within a threshold distance of each other vertex in the group.

Figures 3A, 3B:
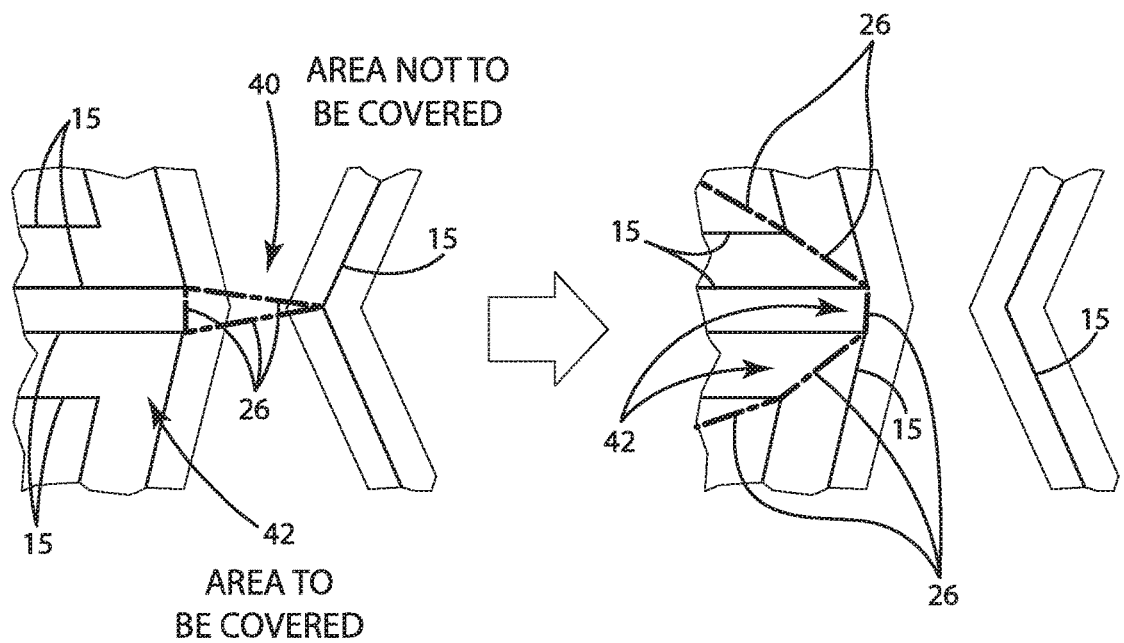
FIGS. 3A and 3B show a variety of bridge connection locations.

The method can include connecting isolated paths to neighboring path lines by adding bridges, for example as shown in FIGS. 2A-B. When determining placement of the bridge connections, the planned deposition by the original toolpath 15 can be considered such that bridge connections 26 are restricted to regions where deposition is expected to cover 42 as shown in FIG. 3B. That is, the method can restrict placement of bridge toolpath connections in areas not to be covered in deposition 40, as shown in FIG. 3A.

Adding the bridge connections can include tracking or checking if each vertex has an even number of edges or connections emanating from it. An edge refers to a line or portion of a toolpath between two vertices. By avoiding or reducing the number of vertexes with an odd number edges empty travel time can be reduced. This is because a vertex with an odd number of edges will require empty travel time that involves stopping/starting deposition, whereas toolpath vertices with an even number edges will not because with an even number of edges there will always be an entrance pathway and an exit pathway.

Referring to FIGS. 4A-B, the method can loop through all toolpath vertices after an initial batch of bridge connections 26 are added to a toolpath 10 (for example, sufficient bridge connections to connect all or substantially all isolated paths 60). In response to a vertex 18 having an odd number of edges, the method can remove a previously added bridge from the vertex or add an additional bridge 27 from the vertex to a neighboring vertex as shown in FIG. 4B to bring the number of edges to an even number. In some embodiments it may be suitable for the method to leave an odd number of edges emanating from a vertex or certain vertices, for a variety of reasons. Although doing so may lead to some empty travel time during the additive manufacture process, by adding bridges at some or substantially all of the toolpath vertices to ensure an even number of pathways emanating from the vertices, the total deposition time can still be substantially reduced. Instead or in addition to checking the number of edges after an initial batch of bridge connections are added to the toolpath, some embodiments can track and adjust the number of edges of toolpath vertices contemporaneously while adjusting (e.g., adding or subtracting) bridge connections to the toolpath.

Adding the bridge connections can also include generating an output including the bridge connections, for example toolpath adjustments, a new complete toolpath, or additive manufacture instructions. The method can utilize essentially any suitable algorithm to generate the output based on the one or more toolpaths with the new bridge connections. For example, the method can determine a revised or updated toolpath using essentially any sequencing algorithm, routing algorithm, or optimization algorithm. Many such algorithms utilize graph theory to determine an optimum or improved travel path. That is, the original toolpath, including an original toolpath with or without sequencing information, can be converted or received as a graph with a list of vertices and edges—the added bridge connections can represent additional edges that allow for a more efficient route. One such exemplary algorithm is the Chinese Postman algorithm. In general, the method can include determining a toolpath by checking how many vertices have an odd number of edges and where these vertices are located. Then, the Chinese Postman algorithm or another suitable routing algorithm can be utilized to determine an efficient route for not only traversing the graph, but also where any empty travel, if any, should be located, while reducing or minimizing the total travel distance. The method can include formatting or translating this output into toolpath adjustments for each layer, a new complete toolpath for each layer, additive manufacturing instructions stored in memory, such as a G-Code file, or any combination thereof. The method can include communicating the toolpath adjustments or new complete toolpaths to a slicer, such as a slicer that provided a base toolpath before the bridge connections were added or communicating the toolpath adjustments, new toolpaths, or additive manufacturing instructions to additive manufacturing equipment for printing. In embodiments, where the bridges are added by software or programming in the additive manufacturing equipment, the toolpath adjustments, new toolpaths, or additive manufacturing instructions can be used by its controller to create the additive structure including the bridge connections.

Figure 5A:
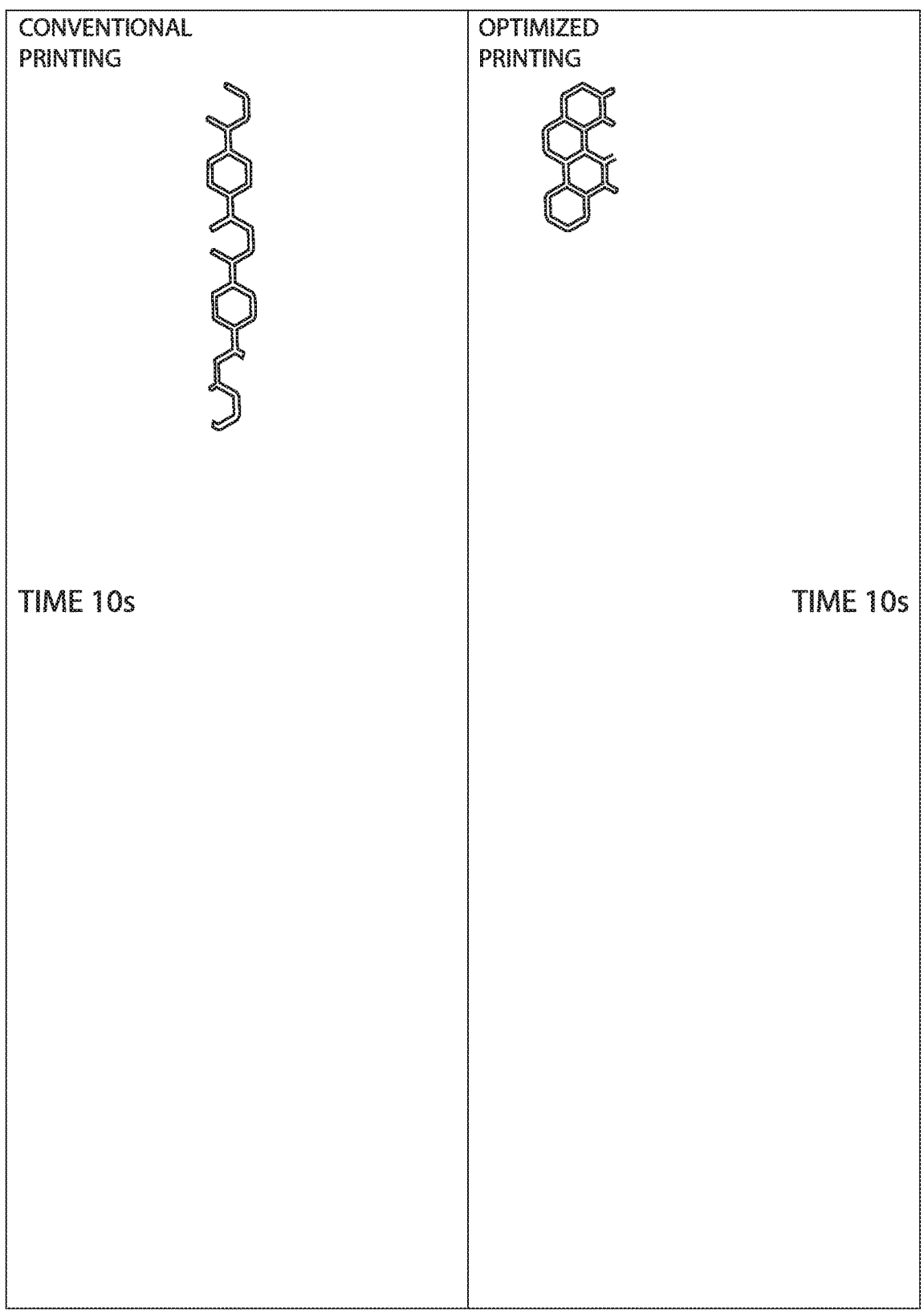
FIGS. 5A-C show a comparison between conventional printing and one embodiment of the present disclosure.
Figure 5B:
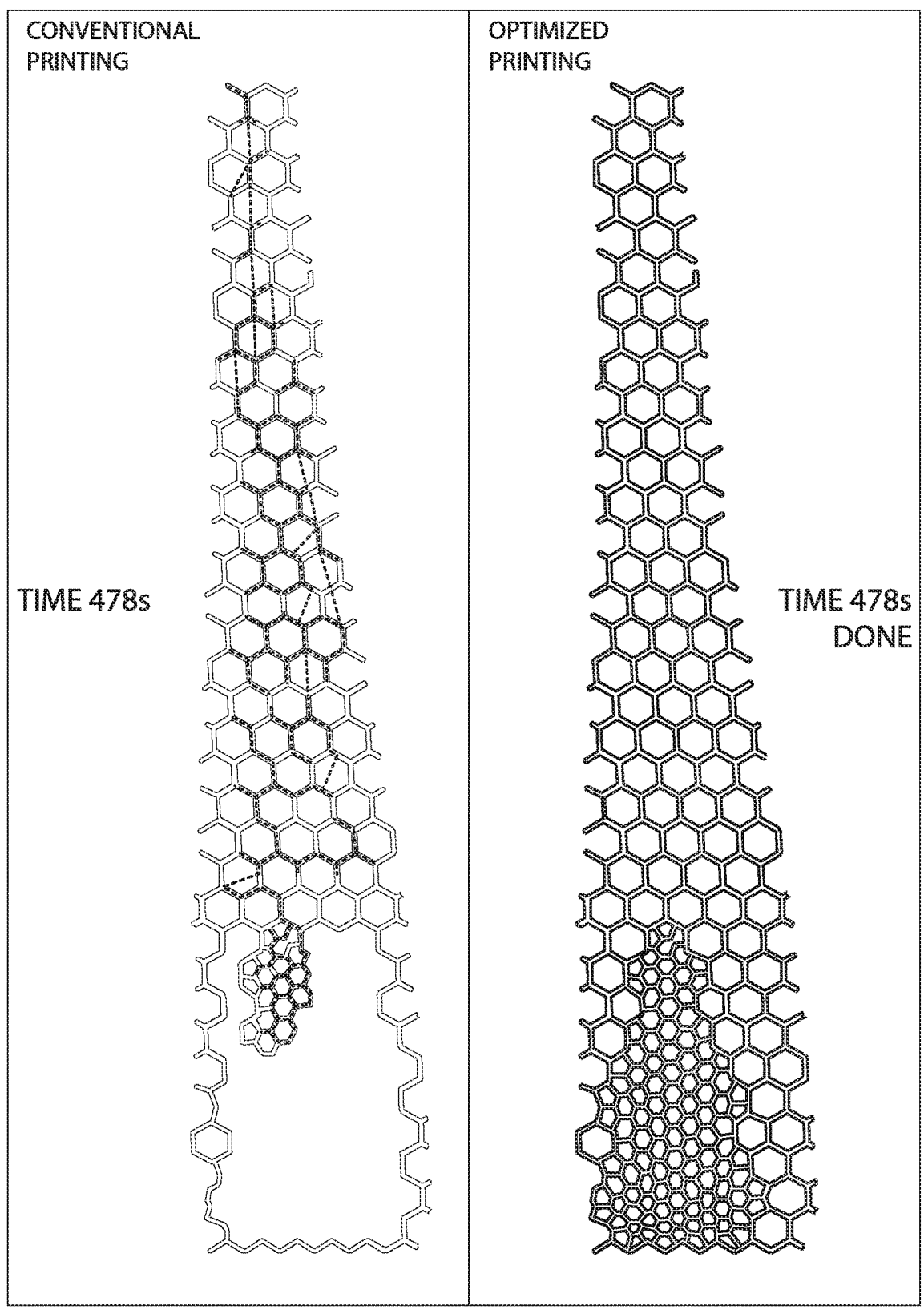
Figure 5C:
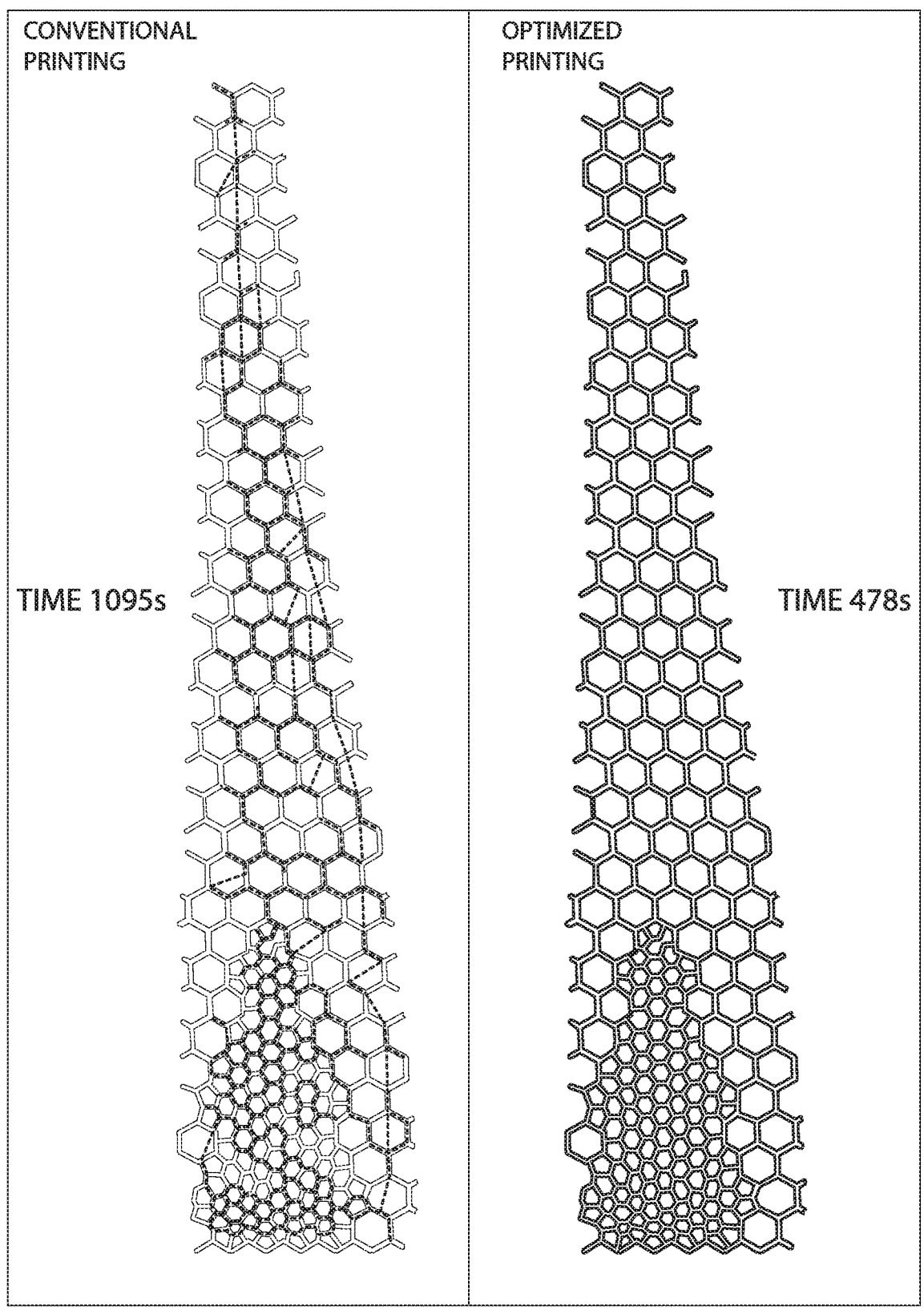

The system and method are effective at minimizing or reducing the number of vertices in the toolpath with an odd number of edges, which leads to minimal or reduced travel movements of the additive manufacturing equipment and a decrease in print time. The computational time for adjusting, including for example optimizing or improving, the toolpath with an embodiment of the system and method typically only takes a few minutes, but the time savings from the adjustment are significant. In one exemplary embodiment, a system and method of the present disclosure can generate G-Code for additive manufacture of a honeycomb structure of a windmill blade without any empty travel. That is, the entire structure of each layer was printed continuously without stopping or restarting the deposition of material from the nozzle. In contrast, G-Code developed for the same geometry with a conventional slicing method without toolpath adjustment results in significant empty travel. FIGS. 5A-5C illustrates a comparison between the two exemplary print jobs. FIG. 5A shows a comparison near the beginning of the print job after about 10 seconds have passed. FIG. 5B illustrates where the printing is at for the conventional print at the time the improved or optimized print is complete, in this example after about 478 seconds. FIG. 5C illustrates the comparison once conventional printing is complete, where the total time for the printing using conventional toolpaths was about 1095 seconds compared to just 478 seconds using adjusted toolpaths. Referring to the figures, the solid lines indicate deposition and the dashed lines indicate empty travel.

In addition to the successful and faster printing, the current embodiments can enhance bonding between beads. Bead is one term used to describe the thin strip of extruded material deposited during the additive manufacturing process. Put another way, a bead is one continuous deposition of material, such as polymer. Within the larger context of a 3D printed or additively manufactured object, the entire part is made of layers, the layers are made of beads (or as in some of the disclosed embodiments described herein within a continuous layer toolpath, a single bead). One complete path is a bead, and each path/bead has individual moves. For example, the perimeter of a square would have four moves to make the one path, one bead. In conventional printing, generally one bead is extruded for each isolated path on a layer whereas if bridges are added fewer, longer, beads may be utilized to print the same layer. In cases where there is a continuous path for a layer a single bead can deposited along the entire path without stopping the extrusion. Using conventional toolpaths, beads in the additive structure are often distinguishable either during printing or even to some extent in the final additive structure. For example adjacent beads 94, 95 in the conventionally printed hexagonal mesh pattern are distinguishable from each other in the portion illustrated in FIGS. 6A and 6C and adjacent beads 96, 97 are distinguishable from each other in FIGS. 6A and 6D. Many conventional slicing methods lead to gaps 90 between beads in the final additive structure. Gaps can form at the corner points of polygonal shapes as shown in FIGS. 6A-D. For example, gap 90 between vertices 71, 72, 73 and gap 91 between vertices 74, 75, 76. Gaps can also form along adjacent beads of material. For example, gap 92 between beads 96, 97. These gaps can result in the additive structure becoming susceptible to fracture due to a weak bonding and eventual fracture along the bead interfaces, for example as shown in FIG. 6B.

While parallel bead portions 94, 95 are generated by a toolpath that is parallel and do not overlap (e.g., as shown in FIG. 4B), the bead portions themselves can overlap depending on a variety of factors, such as extrusion rate, nozzle width, and path placement, to name a few. In general, the toolpath generation algorithm aims for the bead portions to be laid parallel right up against each other, and maybe slightly overlapped, to provide a good bond and strong structure. However, there is a balance to be struck because if the bead portions overlap too much it could potentially cause a ridge or hump in the center where the two bead portions and if there is too little overlap, there will be a gap—especially as the bead portions shrink in size.

Figure 7A:
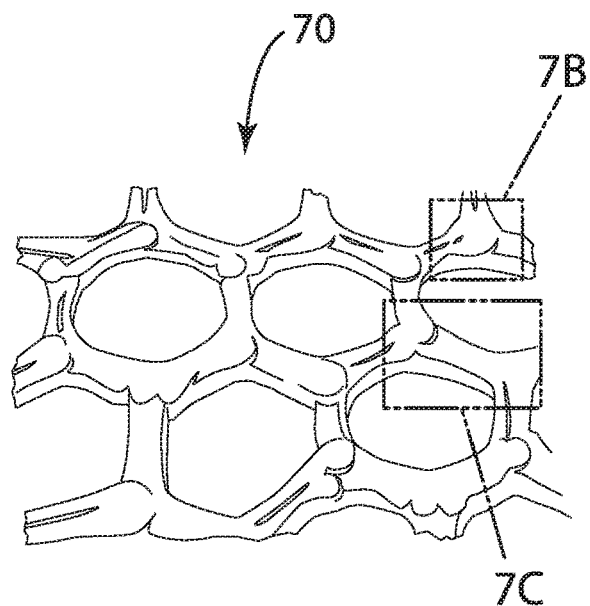
FIGS. 7A-C show a portion of an additive structure generated from instructions produced by one embodiment of the system and method of the present disclosure.
Figure 7B:
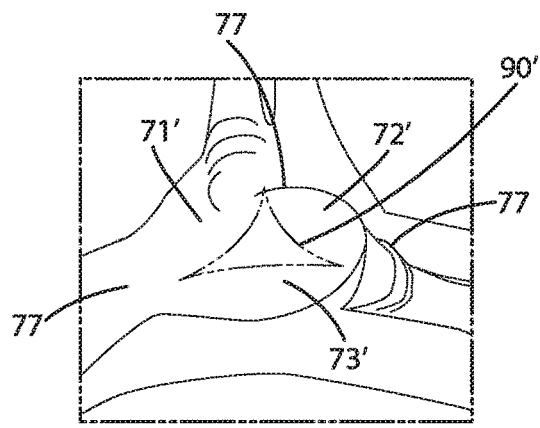
Figure 7C:
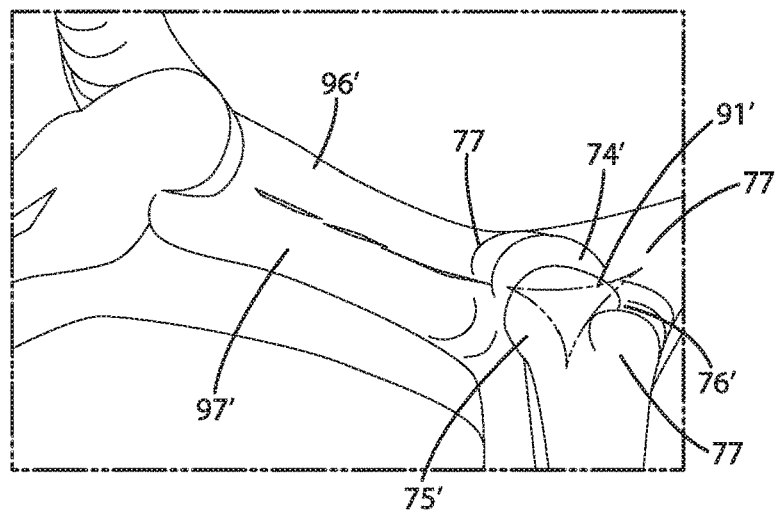

Some embodiments of the present disclosure can improve the toolpath by enhancing the structural integrity of the resultant additive structure. For example, FIGS. 7A-C illustrate one embodiment of the system and method that show a portion of an additive structure produced with an improved toolpath of the present disclosure. Specifically, the improved toolpath fills gaps in the resultant additive structure 70, which provides stronger bonding, as shown in FIGS. 7A-C. More specifically, the improved, continuous, toolpath bridge connections can result in filling gaps between portions of the bead that would otherwise be present, which results in stronger boding. For example, gaps 90 and 91 that were present between vertices 71, 72, 73 and between 74, 75, 76 in the additive structure of FIGS. 6C-D produced with a conventional process are not present in FIGS. 7A-C. That is, there is no gap between vertices 71', 72', 73' or vertices 74', 75', 76'. To aid in visualizing the difference the filled gap, the position of where the gaps would be 90', 91' but for the bridge deposition is shown in phantom. The improved toolpath includes bridge path connections between pairs of vertices that result in bridges 77 at each vertex, in the depicted embodiment there are three bridges between the 74', 75', 76' vertices and three bridges between the 71', 72', 73' vertices, arranged as shown in the FIG. 4B toolpath.

In the depicted embodiment of FIGS. 7A-C, the toolpath that produced the resultant additive structure is generally continuous or Eulerian, meaning that a single bead was deposited over the toolpath layer without stopping the deposition. As a result, there was no empty travel time. In addition, because the toolpath is generally continuous or Eulerian, the bead never double-backs on itself. That is, the continuous or Eulerian toolpath visits each edge of the toolpath exactly once, but allows revisiting of vertices. This reduces total deposition time, but also increases the structural integrity of the additive stricture generated by the toolpath. Specifically, because there are bridge connections near the corners or vertices of the polygons those areas receive additional deposition. This may best be understood with reference to FIG. 4B. Traversing the base toolpath without bridges, each vertex 18 is traversed a single time. In contrast, with the three bridge path connections 27 in place, each vertex is traversed twice (though the edges leading to the vertex are each only traversed once). In addition, the bridge connections themselves provide additional deposition. This additional traversal of the vertices and traversal of the bridge connections result in additional deposition, which fills gaps that would normally be left by the base toolpath and strengthens the bonds. This can be seen in the close-up views of the resultant additive structure produced with one embodiment of the present disclosure shown in FIGS. 7B-C, which shows in phantom lines where the gaps 90', 91' would have been but for the bridge connections.

Referring to FIGS. 6A-D, in conventional 3D printing, corner gaps 90, 91 are often prevalent in these types of structures, while line gaps 92, 93 are often minimized by controlling the extrusion amount and the overlap amount between the beads. Typically, a deposited bead shrinks as it cools (i.e., its volume decreases), and two parallel beads that were initially bonded can be separated as they cool. Accordingly, proper calibration can be helpful to reduce or minimize line gaps. For some types of small-scale printing, the printing conditions are generally well parameterized and documented in the software library (e.g., common slicers). Therefore, it can be relatively easy to avoid line gaps. However, the same is not true for large-scale printing, where both corner gaps and line gaps are common issues.

Some embodiments of the present disclosure provide reduction and, in some cases, elimination of line gaps. Referring again to FIG. 4B, although there is no additional travel along the edges emanating from vertices 18 with the bridge connections in place, due to the additional deposition at each vertex 18 and along the bridge connections 27, in some embodiments, the nozzle drags deposition along the edges filling in the line gaps as well. Perhaps this is most clearly illustrated by comparison of gap 92 between beads 96, 97 in FIG. 6D and the lack of any significant gap between bead portions 96', 97' in FIG. 7C.

While bridge connections can significantly reduce layer and total deposition time, one potential issue is overfilling. In large part, overfilling is not a significant issue because the additional deposition added by virtue of the bridge connections is relatively small, and as discussed above often the additional deposition is welcomed because it is added at a location where gaps are often present in the structure. However, bridge connections are generally being added in locations where deposition is already planned for that layer. In some embodiments, the extrusion speed or deposition speed can be slowed while a bridge connection is being made so that the amount of material exiting the nozzle is reduced during deposition of the bridge connection. The extrusion speed can be slowed by whatever amount is suitable for the application and by any suitable method. In the current embodiment, the speed at which the gantry/printer is traversing is left unchanged. A calibration exercise can be performed that is particular to the deposition material, but typically the bridge connection extrusion speed is slowed to about 25% of printing extruder speed. This offers a good balance between providing some additional deposition that assists with filling gaps without creating overfilling issues. As another example, the extrusion rate during bridging movement is generally adjusted to less than the average extrusion rate outside of bridging movement. Current embodiments have been applied to both small and large scale printers without experiencing overfilling. While optional, reducing the extrusion amount during the bridging movement can be particularly effective in ensuring there is no overfilling issues during small scale printing. In alternative embodiments, the movement speed of the gantry/printer/nozzle can be changed instead of, or in addition to, adjustments to the extrusion speed or other adjustments during the bridging movement.

Other speeds and printing details are generally set by the G-Code from the slicer and generally do not need to be adjusted based on the embodiments of the present disclosure. However, about the embodiments of the present disclosure precludes such adjustments either.

An exemplary embodiment will now be described in detail with regard to additively manufacturing wind turbine blade graded infill. In additively manufactured components, infill structure significantly affects the mechanical performance of the final printed part. However, mechanical stress induced by operation loads has been largely neglected for patterning. Most slicers currently available in the market provide infill patterns that are uniform in shape and size regardless of the operational loading. One embodiment provides an infill pattern that accounts for induced stress. This approach differs from topology optimization as it focuses on the porous infill, which allows the external shape of the printed part to remain intact. The current embodiment uses a computational stress analysis to control the distribution of the local density of the infill pattern. The approach in the example described herein is applicable to a wind turbine blade core with infill densities adjusted or optimized based on the structural loads, however it should be understood the approach is also applicable to essentially any infill structure, whether or not graded or adjusted or optimized based on structural load. That being said, the approach is also applicable to other objects or parts where a computational stress analysis provides meaningful information about the structural load. With respect to the blade core of the current embodiment, it can be fabricated in a big area additive manufacturing (BAAM) system. To ensure less warpage and better inter-layer bonding, fast layer deposition can be utilized. The tool path sequencing can be adjusted or optimized as discussed herein by adding bridge paths between isolated paths in the toolpath that result in bridges being deposited during the additive manufacturing process. The bridge paths enable a reduction in deposition time to be obtained when an updated toolpath is determined, for example via a Chinese Postman algorithm or other graph theory travel algorithm. For the application of wind turbine infill, the deposition using the adjusted toolpath was about twice as fast as the deposition using the base or original toolpath obtained by conventional slicing.

Slicers available in the market provide various infill patterns and infill densities. Both infill density and the geometric structure of the infill pattern can affect the mechanical properties of the finished additive structure. In general, honeycomb shape infill shows higher modulus than any of diamond, egg crate, or Hilbert shape with the same amount of material. For a given infill shape, a dense infill typically shows higher stiffness than a coarse infill due to different amounts of material used. For the same amount of material with a given shape (e.g., honeycomb shape), high mechanical performance can be obtained by redistributing infill density—coarse infill for low stress area and dense infill for high stress area. However, most slicers available in the market do not provide the feature for generating non-uniform, graded infill shapes. Honeycomb-shape infill with varying hexagon sizes based on a given stress field can be provided and applied to wing design. It gray be worth noting that this approach differs from topology optimization, which changes the external shape of a product as opposed to focusing on the porous infill while leaving the external shape of the printed part intact. Embodiments of the system and method are suitable for manually-designed internal structures (e.g., non-uniform lattice) as well as uniform lattice structures. Currently, slicer-generated infills are generally uniform lattices so far.

As discussed herein, an exemplary embodiment of the present disclosure provides a system and method for manufacturing a turbine blade core or other additive structure via additive manufacture.

Figure 10:
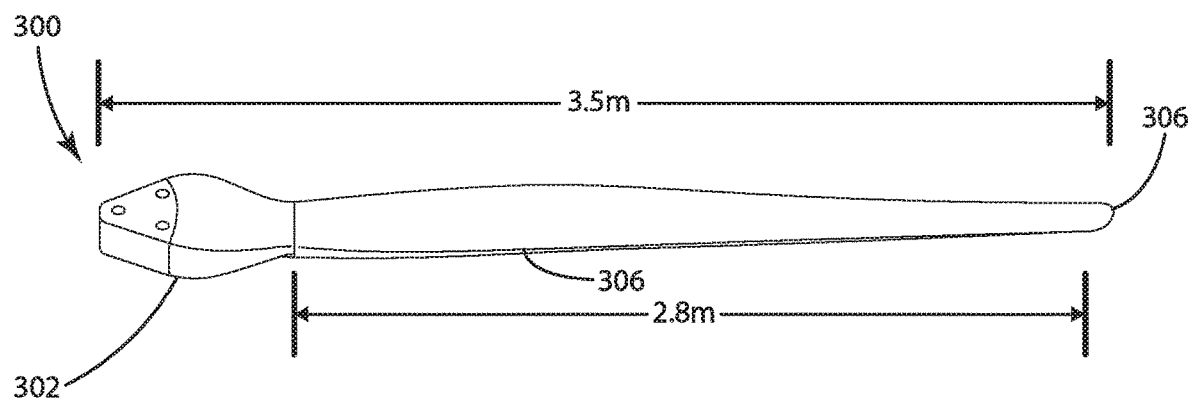
FIG. 10 shows a perspective view of a wind turbine blade.

The exemplary infill core is suitable for use in connection with blade model 442SR from XZERES Corp. As shown in FIG. 10, the blade 300 includes a root 302, a mid-span blade 304, and a tip 306. The total length of this exemplary blade is 3.5 m and the length of the mid-span blade is 2.8 m.

Figure 12:
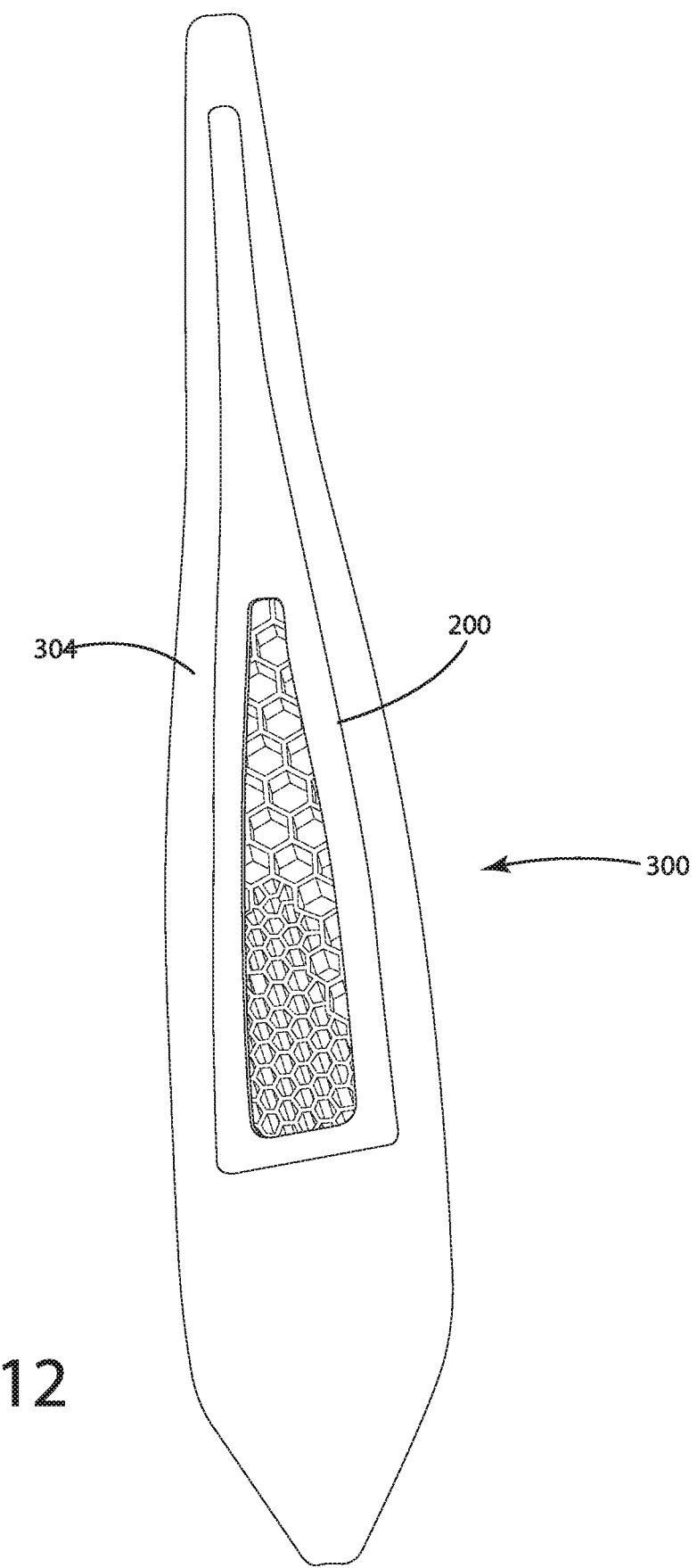
FIG. 12 shows a wind turbine blade with the core of FIG. 11 enclosed within a blade shell.

Perhaps as best shown in FIG. 12, the skin of the mid-span blade 304 encloses a core structure 200 which is capable of fabrication with an embodiment of the additive manufacturing system and method described herein.

Figure 11:
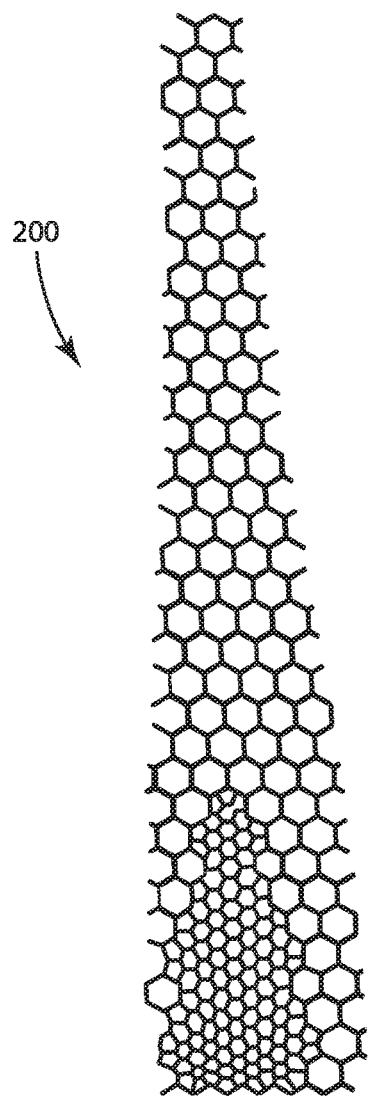
FIG. 11 shows a 3D printed honeycomb infill structure of a wind turbine blade core.

A CAD-defined or slicer-defined infill pattern can be used to generate a base toolpath for the addition of bridges. The infill pattern can be uniform or, as shown in FIG. 11 non-uniform, adding bridges according to an embodiment of the present disclosure is effective regardless of the uniformity of non-uniformity of the lattice. For a slicer-defined infill pattern, essentially any packaging algorithm can be utilized to generate a lattice infill pattern, whether existing now or developed in the future.

One of the challenges in printing the honeycomb shape infill depicted in FIG. 11 is in reducing layer deposition time. This can be particularly important in a BAAM system with an open-air build area, where an infill mesh may not succeed due to long layer deposition time (e.g., greater than 30 minutes). As discussed above, layer deposition time can be lowered by application of an embodiment of the system and method of the present disclosure that reduces or minimizes total distance of the nozzle movement for a given geometry. More specifically, for example, by adding bridge connections that make a contiguous connection between all (or substantially all) isolated paths and recalculating or updating the toolpath, for example utilizing a graph travel algorithm such as the Chinese Postman algorithm, the total deposition time can be significantly reduced. Further savings can be realized by adding bridge connections such that the toolpath for each layer is continuous or Eulerian before recalculating or updating the toolpath.

The Chinese postman problem (CPP) or route inspection problem asks the following question: Having begun at a given vertex on a graph, what is the minimal distance required to traverse all the edges of the graph? A graph G=V, E) is a vertex set V=[$v_1, v_2, \ldots, v_n$], for some integer n, and an edge set E={$v_iv_j$\i≠j} where $v_iv_j$ is an edge connecting vertices $v_i$ and $v_j$ and 1≤i≤n, 1≤j≤n. For this application, we let $v_1$=($x_i$, $y_i$), points to be traversed by a 3D printer's extruder, but theoretically $v_1$ can be any element in a set. The degree of a vertex is the number of neighboring vertices to a given cortex. For instance, if vertex $v_1$ is connected to vertex $v_{25}$ by an edge, to $v_{174}$ by an edge, to vertex $v_3$ by an edge, and to vertex $v_7$ by an edge, then vertex $v_1$ has degree four. If a vertex has odd degree, it can be referred to as an odd vertex, and likewise for even vertices. An ordered list of the degrees of all the vertices of a graph can be referred to as the graph's degree sequence.

The CPP can be solved for a given graph by finding all Eulerian cycles from a given vertex on a graph. A cycle is a sequence of edges in a graph that ends where it begins. In graph theory, a graph is typically called a Eulerian graph if it can be drawn without picking up a pen. Similarly, an additive manufacturing toolpath can be referred to as a Eulerian path if it can be traversed by the printer equipment without empty travel or back-tracking. If, in attempting to find the Eulerian cycles that start at a given vertex in a graph, there are paths that are not Eulerian cycles, then, in some embodiments, edges can be added to the graph to make those incomplete paths Eulerian. In this way, solving the CPP is equivalent to finding Eulerian cycles from a starting vertex or completing Eulerian cycles by adding edges to the graph in some way.

While adding empty travel is one way to solve or address the CPP, the addition of bridge connections before or during application of a CPP solution can result in a significant reduction of deposition time. That is, by including bridge connections according to an embodiment of the present disclosure, the CPP solution when applied to the toolpath can identify a continuous or Eulerian path that does not require empty travel time at all. Or, even if such a path is not possible, the bridge connections can result in a more efficient CPP solution being possible for a given toolpath than otherwise would not have been possible without the bridge connections.

Accordingly the CPP algorithm (or another routing algorithm) can analyze the base toolpath, without bridge connections, and identify a traversal path that uses empty travel. However, by adding bridge connections, the CPP (or another routing algorithm) can provide a significant layer time reduction because bridge connections added in accordance with an embodiment of the present disclosure can eliminate or significantly reduce the amount of empty travel in the traversal path. That is, the bridge connections can ensure that application of the CPP algorithm (or another routing algorithm) can identify a continuous or Eulerian path, or at least a path that has fewer isolated paths than the base toolpath. The process can be repeated for each toolpath layer and each improved traversal path can be translated to an adjustment of the base toolpath, a new toolpath, or additive manufacturing instructions for controlling additive manufacturing equipment to additively manufacture an additive structure.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method of improving an additive manufacturing toolpath for an object, the method comprising:
    obtaining a base toolpath;
    identifying a plurality of isolated paths in the base toolpath, each of the plurality of isolated paths including a plurality of vertices;
    adding a plurality of bridge paths to the base toolpath, wherein each bridge path connects one vertex of the plurality of vertices from one of the plurality of isolated paths to a neighboring vertex from the plurality of vertices from a different one of the plurality of isolated paths;
    counting a number of paths emanating from each vertex of the plurality of vertices including paths in the base toolpath and bridge paths, in response to each vertex where the number of paths emanating from that vertex is an odd number of paths, adding an additional bridge path to an unconnected neighboring vertex or removing a previously added bridge path.

2. The method of claim 1 including determining whether one of the plurality of vertices from one of the plurality of isolated paths neighbors a vertex of a different one of the plurality of isolated paths by comparing distance therebetween to a threshold value.

3. The method of claim 1 wherein the base toolpath includes an infill toolpath that defines internal structure of the object.

4. The method of claim 1 wherein the base toolpath includes a perimeter toolpath that defines surface features of the object.

5. A method of improving an additive manufacturing toolpath for an object, the method comprising:
    obtaining a base toolpath;
    identifying a plurality of isolated paths in the base toolpath, each of the plurality of isolated paths including a plurality of vertices;
    adding a plurality of bridge paths to the base toolpath, wherein each bridge path connects one vertex of the plurality of vertices from one of the plurality of isolated paths to a neighboring vertex from the plurality of vertices from a different one of the plurality of isolated paths;
    generating printer instructions for each layer of the object, wherein the printer instructions for one layer are generated based on the base toolpath including the plurality of added bridge paths; and
    wherein the printer instructions for the one layer include instructions to decrease extrusion speed during printing of the plurality of added bridge paths.

6. The method of claim 5 including restricting the adding of the plurality of bridge paths to areas to be covered in deposition during additive manufacturing of the object according to the base toolpath.

7. The method of claim 5 wherein the printer instructions for the one layer include instructions to print that layer of the object in a continuous path.

8. A method of improving additive manufacturing of an object, the method comprising:
    obtaining a plurality of toolpaths for additive manufacture of the object, wherein each of the plurality of toolpaths includes a plurality of vertices and a plurality of isolated paths between different sets of two or more of the plurality of vertices;
    defining a plurality of bridge paths, wherein each bridge path connects one of the plurality of vertices of one of the isolated paths to a neighboring vertex of a different one of the plurality of isolated paths;
    generating additive manufacturing instructions for additive manufacture of the object based on the plurality of toolpaths and the plurality of bridge paths;
    additively manufacturing the object according to the additive manufacturing instructions; and
    tracking whether a number of paths emanating from each vertex, including the plurality of isolated paths between the vertices and the plurality of defined bridge paths, is an odd number of paths, and in response defining an additional, different, bridge path from that vertex to a neighboring vertex or removing a previously defined bridge path.

9. The method of claim 8 wherein each of the plurality of toolpaths is associated with a different layer of the object.

10. The method of claim 8 including restricting the defining the plurality of bridge paths to areas to be covered during additive manufacturing of the object according to one of the plurality of toolpaths.

11. The method of claim 8 wherein additively manufacturing the object includes additively manufacturing the object, using a deposition-based additive manufacturing machine, in a series of layers by a controller of the deposition-based additive manufacturing machine moving a deposition nozzle of the deposition-based additive manufacturing machine according to the additive manufacturing instructions, wherein the deposition nozzle follows a substantially continuous path during deposition of each of the layers of the series of layers, wherein deposition of each of the layers is substantially non-stop.

12. A method of improving additive manufacturing of an object, the method comprising:
    obtaining a plurality of toolpaths for additive manufacture of the object, wherein each of the plurality of toolpaths includes a plurality of vertices and a plurality of isolated paths between different sets of two or more of the plurality of vertices;
    defining a plurality of bridge paths, wherein each bridge path connects one of the plurality of vertices of one of the isolated paths to a neighboring vertex of a different one of the plurality of isolated paths;
    generating additive manufacturing instructions for additive manufacture of the object based on the plurality of toolpaths and the plurality of bridge paths; and
    additively manufacturing the object according to the additive manufacturing instructions using a deposition-based additive manufacturing machine, in a series of layers by a controller of the deposition-based additive manufacturing machine moving a deposition nozzle of the deposition-based additive manufacturing machine according to the additive manufacturing instructions, wherein the deposition nozzle follows a continuous path during deposition of each of the layers of the series of layers, and wherein an extrusion rate of the deposition nozzle is reduced during deposition on the plurality of bridge paths.

13. The method of claim 12 including determining whether a vertex of a different one of the isolated paths neighbors the one of the plurality of vertices of the one of the isolated paths by comparing distance therebetween to a threshold distance.

14. The method of claim 12 wherein each of the plurality of toolpaths includes an infill toolpath that defines internal structure of the object.

15. The method of claim 12 wherein each of the plurality of toolpaths include a perimeter toolpath that defines surface features of the object.

\* \* \* \* \*

UNITED STATES PATENT AND TRADEMARK OFFICE
CERTIFICATE OF CORRECTION

PATENT NO. : 11,534,977 B2
APPLICATION NO. : 16/750631
DATED : December 27, 2022
INVENTOR(S) : Seokpum Kim et al.

Page 1 of 1

It is certified that error appears in the above-identified patent and that said Letters Patent is hereby corrected as shown below:

On the Title Page

Item (72), Line 2:
"Vlastimil Kune, Knoxville, TN (US)"
Should be:
--Vlastimil Kunc, Knoxville, TN (US)--

Signed and Sealed this
Fourteenth Day of March, 2023

Katherine Kelly Vidal
*Director of the United States Patent and Trademark Office*